United States Patent
Sano et al.

(10) Patent No.: US 8,599,436 B2
(45) Date of Patent: Dec. 3, 2013

(54) PRINTING USING INKS OF PLURAL COLORS INCLUDING WHITE COLOR

(75) Inventors: Tsuyoshi Sano, Shiojiri (JP); Takayoshi Kagata, Shiojiri (JP); Yoshihiko Matsuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 477 days.

(21) Appl. No.: 12/753,037

(22) Filed: Apr. 1, 2010

(65) Prior Publication Data

US 2010/0253957 A1 Oct. 7, 2010

(30) Foreign Application Priority Data

Apr. 3, 2009 (JP) ................................. 2009-090748
Jan. 15, 2010 (JP) ................................. 2010-006530

(51) Int. Cl.
*H04N 1/60* (2006.01)

(52) U.S. Cl.
USPC ................... 358/1.9; 358/1.8; 347/7; 347/12; 347/15; 347/42; 347/43; 347/100

(58) Field of Classification Search
None
See application file for complete search history.

(56) References Cited

U.S. PATENT DOCUMENTS

| | | | |
|---|---|---|---|
| 5,562,353 A | 10/1996 | Handa et al. | |
| 6,102,536 A * | 8/2000 | Jennel | 347/100 |
| 6,552,820 B1 * | 4/2003 | Hill | 358/1.8 |
| 6,776,474 B2 | 8/2004 | Yang et al. | |
| 6,783,203 B2 * | 8/2004 | Fujimori | 347/15 |
| 6,902,249 B2 * | 6/2005 | Suzuki et al. | 347/15 |
| 7,407,277 B2 * | 8/2008 | Yoneyama | 347/102 |
| 7,794,077 B2 * | 9/2010 | Falser et al. | 347/104 |
| 7,920,297 B2 * | 4/2011 | Doggett et al. | 358/3.29 |
| 8,077,350 B1 * | 12/2011 | Simmons | 358/1.9 |
| 8,154,761 B2 * | 4/2012 | Huber et al. | 358/1.9 |
| 8,164,786 B2 * | 4/2012 | Watanabe | 358/1.9 |
| 2001/0020964 A1 * | 9/2001 | Irihara et al. | 347/43 |
| 2005/0162451 A1 * | 7/2005 | Suzuki et al. | 347/12 |
| 2006/0158473 A1 * | 7/2006 | Mills et al. | 347/15 |
| 2006/0158481 A1 * | 7/2006 | Spevak et al. | 347/43 |
| 2007/0188535 A1 * | 8/2007 | Elwakil et al. | 347/15 |
| 2008/0211866 A1 * | 9/2008 | Hill | 347/42 |
| 2008/0218539 A1 * | 9/2008 | Hill et al. | 347/7 |
| 2008/0273052 A1 * | 11/2008 | Imhoff | 347/15 |
| 2009/0027730 A1 * | 1/2009 | Monga et al. | 358/3.06 |
| 2009/0081423 A1 * | 3/2009 | Sano | 428/195.1 |
| 2009/0225337 A1 * | 9/2009 | Watanabe | 358/1.9 |

FOREIGN PATENT DOCUMENTS

| | | |
|---|---|---|
| CN | 1120200 A | 4/1996 |
| CN | 1572513 A | 2/2005 |
| JP | 2002-038063 A | 2/2002 |

* cited by examiner

*Primary Examiner* — King Poon
*Assistant Examiner* — Ted Barnes
(74) *Attorney, Agent, or Firm* — Kilpatrick Townsend & Stockton LLP

(57) ABSTRACT

Disclosed is a printing apparatus that performs printing by using inks of plural colors including a white color, which includes a first image forming unit that forms a first image, and a second image forming unit that forms a second image such that at least a part of the second image overlaps the first image. The second image forming unit forms at least a part of a section of the second image, which overlaps the first image, by using only a white ink, and forms at least a part of a section of the second image, which does not overlap the first image, by using inks of a white color and at least one color other than the white color.

8 Claims, 28 Drawing Sheets

COLOR IMAGE DATA Cdata
(CMYK 32 bit/PIXEL)

WHITE IMAGE DATA WINdata
OF NON-OVERLAPPING PART
WINdata
(W 8 bit/PIXEL)

WHITE IMAGE DATA WIOdata
OF OVERLAPPING PART
WIOdata
(W 8 bit/PIXEL)

WHITE – COLOR PRINT (W–C PRINT)

COLOR – WHITE PRINT (C–W PRINT)

FIG. 14A
Lab-CMYK CONVERSION  LUTw1

| L | a | b | VIRTUAL CMYK | | | |
|---|---|---|---|---|---|---|
| | | | C | M | Y | K |
| 95 | 0 | 0 | 0 | 0 | 0 | 0 |
| 94 | 5 | 0 | 0 | 0 | 5 | 0 |
| 94 | 0 | 5 | 0 | 5 | 5 | 0 |
| 94 | 0 | -5 | 3 | 0 | 0 | 0 |
| 94 | -5 | 0 | 3 | 0 | 0 | 0 |
| 93 | 0 | 0 | 0 | 0 | 0 | 0 |
| 93 | 5 | 5 | 0 | 5 | 5 | 0 |
| 93 | 5 | -5 | 3 | 0 | 5 | 0 |
| 93 | 0 | 10 | 0 | 5 | 10 | 0 |
| 93 | 0 | -10 | 6 | 0 | 0 | 0 |
| 93 | -5 | 5 | 3 | 0 | 5 | 0 |
| 93 | -5 | -5 | 6 | 0 | 0 | 0 |
| 93 | -10 | 0 | 6 | 0 | 0 | 0 |
| 93 | -10 | 0 | 6 | 0 | 0 | 0 |
| 92 | 10 | 5 | 0 | 10 | 5 | 0 |
| 92 | 10 | -5 | 3 | 10 | 0 | 0 |
| ... | ... | ... | ... | ... | ... | ... |
| 87 | -10 | 5 | 6 | 0 | 5 | 2 |
| 87 | -10 | -5 | 9 | 0 | 0 | 2 |
| 87 | -10 | -5 | 9 | 0 | 0 | 2 |
| ... | ... | ... | ... | ... | ... | ... |

FIG. 14B
CMYK, T-INK COLOR CONVERSION  LUTw2

| VIRTUAL CMYK, T | | | | | INK COLOR | | | | | | |
|---|---|---|---|---|---|---|---|---|---|---|---|
| C | M | Y | K | T | C | M | Y | K | Lc | Lm | W |
| 0 | 0 | 0 | 0 | 100 | 0 | 0 | 2 | 0 | 0 | 0 | 255 |
| 0 | 0 | 5 | 0 | 100 | 0 | 0 | 7 | 0 | 0 | 0 | 255 |
| 0 | 0 | 10 | 0 | 100 | 0 | 0 | 12 | 0 | 0 | 0 | 255 |
| 0 | 0 | 15 | 0 | 100 | 0 | 0 | 17 | 0 | 0 | 0 | 255 |
| 0 | 5 | 0 | 0 | 100 | 0 | 0 | 2 | 0 | 0 | 8 | 255 |
| 0 | 5 | 5 | 0 | 100 | 0 | 0 | 7 | 0 | 0 | 8 | 255 |
| 0 | 5 | 10 | 0 | 100 | 0 | 0 | 12 | 0 | 0 | 8 | 255 |
| 0 | 5 | 15 | 0 | 100 | 0 | 0 | 17 | 0 | 0 | 8 | 255 |
| 0 | 10 | 0 | 0 | 100 | 0 | 0 | 2 | 0 | 0 | 15 | 255 |
| 0 | 10 | 5 | 0 | 100 | 0 | 0 | 7 | 0 | 0 | 15 | 255 |
| 0 | 10 | 10 | 0 | 100 | 0 | 0 | 12 | 0 | 0 | 15 | 255 |
| 0 | 10 | 15 | 0 | 100 | 0 | 0 | 17 | 0 | 0 | 15 | 255 |
| 0 | 15 | 0 | 0 | 100 | 0 | 0 | 2 | 0 | 0 | 23 | 255 |
| 0 | 15 | 5 | 0 | 100 | 0 | 0 | 7 | 0 | 0 | 23 | 255 |
| 0 | 15 | 10 | 0 | 100 | 0 | 0 | 12 | 0 | 0 | 23 | 255 |
| 0 | 15 | 15 | 0 | 100 | 0 | 0 | 17 | 0 | 0 | 23 | 255 |
| ... | ... | ... | ... | ... | ... | ... | ... | ... | ... | ... | ... |
| 15 | 5 | 15 | 0 | 50 | 0 | 0 | 26 | 2.5 | 19 | 4 | 200 |
| 15 | 10 | 0 | 0 | 50 | 0 | 0 | 13 | 0 | 23 | 15 | 200 |
| 15 | 15 | 5 | 0 | 50 | 0 | 0 | 16 | 2.5 | 19 | 11 | 200 |
| ... | ... | ... | ... | ... | ... | ... | ... | ... | ... | ... | ... |

FIG. 16

CMYK-INK COLOR CONVERSION
LUTc

| CMYK | | | | INK COLOR | | | | | | |
|---|---|---|---|---|---|---|---|---|---|---|
| C | M | Y | K | C | M | Y | K | Lc | Lm | IW |
| 0 | 0 | 0 | 0 | 0 | 0 | 0 | 0 | 0 | 0 | 0 |
| 0 | 0 | 33 | 0 | 0 | 0 | 83 | 0 | 0 | 0 | 0 |
| 0 | 0 | 66 | 0 | 0 | 0 | 165 | 0 | 0 | 0 | 0 |
| 0 | 0 | 100 | 0 | 0 | 0 | 250 | 0 | 0 | 0 | 0 |
| 0 | 33 | 0 | 0 | 0 | 0 | 0 | 0 | 0 | 83 | 0 |
| 0 | 33 | 33 | 0 | 0 | 0 | 83 | 0 | 0 | 83 | 0 |
| 0 | 33 | 66 | 0 | 0 | 0 | 165 | 0 | 0 | 83 | 0 |
| 0 | 33 | 100 | 0 | 0 | 0 | 250 | 0 | 0 | 83 | 0 |
| 0 | 66 | 0 | 0 | 0 | 64 | 0 | 0 | 0 | 165 | 0 |
| 0 | 66 | 33 | 0 | 0 | 64 | 83 | 0 | 0 | 165 | 0 |
| 0 | 66 | 66 | 0 | 0 | 64 | 165 | 0 | 0 | 165 | 0 |
| 0 | 66 | 100 | 0 | 0 | 64 | 250 | 0 | 0 | 165 | 0 |
| 0 | 100 | 0 | 0 | 0 | 200 | 0 | 0 | 0 | 55 | 0 |
| 0 | 100 | 33 | 0 | 0 | 200 | 83 | 0 | 0 | 55 | 0 |
| 0 | 100 | 66 | 0 | 0 | 200 | 165 | 0 | 0 | 55 | 0 |
| 0 | 100 | 100 | 0 | 0 | 200 | 250 | 0 | 0 | 55 | 0 |
| ⋮ | ⋮ | ⋮ | ⋮ | ⋮ | ⋮ | ⋮ | ⋮ | ⋮ | ⋮ | ⋮ |
| 100 | 66 | 0 | 33 | 200 | 64 | 0 | 83 | 55 | 165 | 0 |
| 100 | 66 | 33 | 33 | 200 | 64 | 83 | 83 | 55 | 165 | 0 |
| 100 | 66 | 66 | 33 | 200 | 64 | 165 | 83 | 55 | 165 | 0 |
| ⋮ | ⋮ | ⋮ | ⋮ | ⋮ | ⋮ | ⋮ | ⋮ | ⋮ | ⋮ | ⋮ |

FIG. 19

| | | INK COLOR | | | | | | |
|---|---|---|---|---|---|---|---|---|
| | | CYAN | MAGENTA | YELLOW | BLACK | LIGHT CYAN | LIGHT MAGENTA | WHITE |
| COLOR IMAGE | INK ABBREVIATION | C | M | Y | K | Lc | Lm | IW |
| | INK CODE | 01H | 02H | 04H | 00H | 11H | 12H | 40H |
| WHITE IMAGE | INK ABBREVIATION | WC | WM | WY | WK | WLc | WLm | W |
| | INK CODE | 81H | 82H | 84H | 80H | 91H | 92H | C0H |

ICT

W-C PRINT

C-W PRINT

GAMUT VIEW VIEWED FROM −b* DIRECTION

GAMUT VIEW VIEWED FROM +a* DIRECTION

COLOR IMAGE DATA Cdata
(CMYK 32 bit/PIXEL)

WHITE IMAGE DATA OF
NON-OVERLAPPING PART
WINdata
(W 8 bit/PIXEL)

WHITE IMAGE DATA OF
OVERLAPPING PART
WIOdata
(W 8 bit/PIXEL)

US 8,599,436 B2

PRINTING USING INKS OF PLURAL COLORS INCLUDING WHITE COLOR

Priority is claimed under 35 U.S.C. §119 to Japanese Application No. 2009-090748 filed on Apr. 3, 2009 and Japanese Application No. 2010-006530 filed on Jan. 15, 2010, which is hereby incorporated by reference in its entirety.

BACKGROUND

1. Technical Field

The present invention relates to a technology of performing printing by using inks of plural colors including a white color.

2. Related Art

There has been disclosed a printing apparatus that performs printing by using a white ink in addition to a color ink including a cyan, a magenta and a yellow (for example, refer to JP-A-2002-38063). For example, a printing apparatus that performs printing by using inks of plural colors including a white ink reproduces a color image regardless of the ground color of a print medium, thereby performing a primer treatment of a print medium using a white ink and/or a complementary color process based on the ground color.

In the case of printing an image including a color part and a white part by using inks of plural colors including a white ink, the color of the white part is decided by the color of a white ink, resulting in the difficulty of changing the color of the white part into a desired color. In general, even if inks are referred to as the same "white ink", for example, a case may occur in which the color of a white ink used for a printing machine such as a gravure printing machine or a flexo printing machine is different from the color of a white ink used for a printer such as an inkjet printer. Further, for example, even in the case of a white ink used for an inkjet printer, a case may occur in which colors are different from each other according to the type of printer. Therefore, when an inkjet printer reproduces a packaging film of a product including a white part and a color part which are produced by the printing of a gravure printing machine, it may be difficult reliably to reproduce the color of the white part of the packaging film.

In addition, such a problem is not only limited to the case of using the inkjet printer, but also is a common problem when performing printing by using inks of plural colors including a white ink.

SUMMARY

An advantage of some aspects of the invention is to form a white image with a desired color on a print medium together with a color image when performing printing by using inks of plural colors including a white color.

The invention can be realized as the following forms or applications.

Application 1

According to one aspect of the invention, there is provided a printing apparatus that performs printing by using inks of plural colors including a white color, the printing apparatus including a first image forming unit that that ejects an ink to form a first color image on a print medium, and a second image forming unit that ejects an ink to form a second image on the print medium such that at least a part of the second image overlaps the first image, wherein the second image forming unit forms a first portion, which is at least a part of a section of the second image, which overlaps the first image, by using only a white ink, and forms a second portion which is at least a part of a section of the second image, which does not overlap the first image, by using an ink of a white color and at least one color other than the white color.

According to the printing apparatus, through the use of the inks of plural colors including the white color, the first color image can be formed on the print medium and the second image can be formed on the print medium such that at least a part of the second image overlaps the first image. At this time, the first portion, which is at least a part of the section of the second image overlapping the first image, is formed using only the white ink, and the second portion, which is at least a part of a section of the second image not overlapping the first image, is formed using the ink of the white color and at least one color other than the white color. Consequently, the color of the second portion, which is at least a part of the section of the second image not overlapping the first image, can be employed as an adjusted white color. Thus, in the printing apparatus, when performing the printing by using the inks of plural colors including the white color, a white image can be formed with a desired color on the print medium together with a color image. In addition, in the printing apparatus, the first portion, which is at least a part of the section of the second image overlapping the first image, is formed using only the white ink, so that the influence exerted on the color of the first image due to the formation of the second image can be prevented.

Application 2

According to the printing apparatus according to application 1, a control unit is further provided to control the first image forming unit and the second image forming unit such that the formation of the first image by the first image forming unit is accomplished together with the formation of the second image by the second image forming unit in at least a part of the period during printing.

According to the printing apparatus, the formation of the first image by the first image forming unit is accomplished together with formation of the second image by the second image forming unit in at least a part of the period during the printing, so that it is possible to efficiently perform a printing process of forming the white image of the desired color on the print medium together with the color image.

Application 3

In the printing apparatus according to application 2, the control unit includes an image data conversion unit that generates image data representing the first portion of the second image and image data representing the second portion of the second image by using image data representing the first image and image data representing the second image.

According to the printing apparatus, if the image data representing the first image and the image data representing the second image can be obtained, after the image data representing the first portion of the second image and the image data representing the second portion of the second image are generated, the first portion of the second image can be formed using only the white ink and the second portion of the second image can be formed using the ink of the white color and at least one color other than the white color based on the generated image data.

Application 4

In the printing apparatus according to applications 2 or 3, a head including a first nozzle group serving as the first image forming unit and a second nozzle group serving as the second image forming unit is further provided.

According to the printing apparatus, the first image can be formed on the print medium by using the first nozzle group of the head, and the second image can be formed on the print medium by using the second nozzle group of the head. When performing the printing by using the inks of plural colors including the white color, the white image can be formed with the desired color on the print medium together with the color image, and the influence exerted on the color of the first image due to the formation of the second image can be prevented.

Application 5

In the printing apparatus according to application 4, a print medium feeding mechanism is further provided to move the print medium in a predetermined direction relative to the head, the head extends in the predetermined direction and includes a plurality of nozzle arrays corresponding to the inks of plural colors, and when the head is divided into an upstream part and a downstream part in the predetermined direction, the control unit sets the nozzle arrays located at one of the upstream side and the downstream side as the first nozzle group, and sets the nozzle arrays located at the other one of the upstream side and the downstream side as the second nozzle group.

According to the printing apparatus, the formation of the first image using the first nozzle group can be accomplished together with the formation of the second image using the second nozzle group.

Application 6

In the printing apparatus according to application 5, a printing order specifying reception unit is further provided to receive printing order specifying information for specifying a printing order in an overlapping portion of the first image and the second image, and the control unit sets the nozzle arrays located at the upstream side of the head as the first nozzle group when the printing order specifying information specifies a printing order in which the first image is first formed, and sets the nozzle arrays located at the downstream side of the head as the first nozzle group when the printing order specifying information specifies a printing order in which the second image is first formed.

According to the printing apparatus, the formation of the first image using the first nozzle group can be accomplished together with the formation of the second image using the second nozzle group regardless of the printing order to the first image and the second image.

Application 7

In the printing apparatus according to any one of applications 4 to 6, the second nozzle group does not eject the ink of at least one color other than the white color in the inks of plural colors.

Application 8

In the printing apparatus according to application 7, the inks of plural colors include a combination of a light-colored ink and a dark-colored ink with respect to at least one color tone, and the second nozzle group does not eject the dark-colored ink.

According to the printing apparatus, the white image can be formed with the desired color on the print medium together with the color image, and the quality of the white image can be prevented from being degraded (increase of graininess).

Application 9

In the printing apparatus according to application 7 or 8, the inks of plural colors include a black ink, and the second nozzle group ejects the black ink.

According to the printing apparatus, the white image can be formed with the desired color on the print medium together with the color image, the brightness of the white image can be adjusted, and the color of the white image can be selected in a wide range.

Application 10

In the printing apparatus according to any one of applications 1 to 9, a color specifying unit is further provided to obtain a concentration value with respect to the second portion of the second image and a color value in a predetermined color system, and the second image forming unit forms the second portion of the second image based on the obtained values.

According to the printing apparatus, the white image can be formed with the desired color on the print medium together with the color image, and the color (color of the white image) of the second portion of the second image can be specified accurately and easily.

Application 11

In the printing apparatus according to application 10, the color specifying unit obtains at least one of the concentration value and the color value in the predetermined color system based on a color measurement result of an object.

According to the printing apparatus, the white image can be formed with the desired color on the print medium together with the color image, and the color (color of the white image) of the second portion of the second image can be specified more accurately and more easily.

Application 12

In the printing apparatus according to application 11, the color specifying unit obtains at least one of the concentration value and the color value in the predetermined color system based on a color measurement result in white backing and a color measurement result in black backing.

According to the printing apparatus, since at least one of the concentration value and the color value in the predetermined color system is obtained based on the color measurement result in the white backing and the color measurement result in the black backing, for example, obtaining of the color value in the predetermined color system based on the color measurement result in the white backing and/or obtaining of the concentration value based on the color measurement result in the black backing are accomplished, so that the color (color of the white image) of the second portion of the second image can be specified more accurately and more easily.

Application 13

In the printing apparatus according to any one of applications 10 to 12, the predetermined color system is one of an $L^*a^*b$ color system and an $L^*u^*v$ color system.

Application 14

In the printing apparatus according to any one of applications 1 to 13, the second image forming unit forms a portion in the second portion of the second image, which constitutes a white part of a predetermined code including the white part and a part other than a white color, by using only the white ink.

According to the printing apparatus, in the case of the portion constituting the white part of the predetermined code in the second portion of the second image, an image is formed by using only the white ink, so that the accuracy of reading of the code can be prevented from being reduced.

Further, the invention can be realized in various ways. For example, the invention can be realized in the form of printing method and apparatus, printing control method and apparatus, a printing system including a printing apparatus and a printing control apparatus, a method thereof, a computer program for realizing the function of an apparatus or a system, a recording medium recording the computer program thereon, a data signal including the computer program and embodied in a carrier, and the like.

BRIEF DESCRIPTION OF THE DRAWINGS

The invention will be described with reference to the accompanying drawings, wherein like numbers reference like elements.

FIGS. 14A and 14B are tables partially illustrating one example of a look-up table for a toned white image.

FIG. 16 is a table partially illustrating one example of a look-up table for a color image.

FIG. 19 is a table illustrating one example of the content of an ink code table.

DESCRIPTION OF EXEMPLARY EMBODIMENTS

Hereinafter, embodiments of the invention will be described according to the following sequence.

A. First Embodiment:
A-1. Configuration of Printing System:
A-2. Printing Process:
B. Second Embodiment:
C. Third Embodiment:
D. Fourth Embodiment:
E. Modified Example:

A. First Embodiment

A-1. Configuration of Printing System

Figure 1:
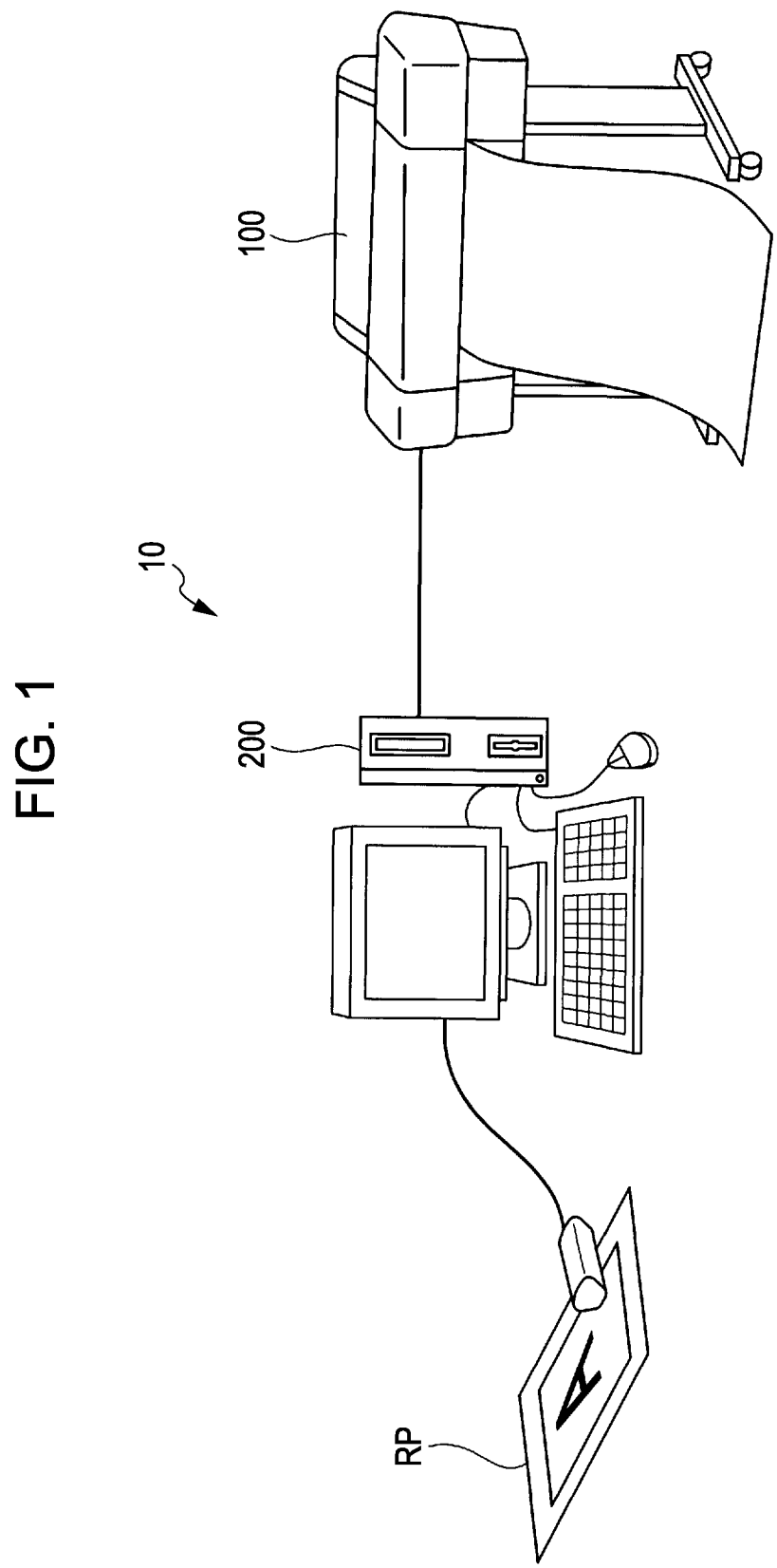
FIG. 1 is a diagram schematically illustrating the configuration of a printing system according to a first embodiment of the invention.

FIG. 1 is a diagram schematically illustrating the configuration of the printing system according to the first embodiment of the invention. The printing system 10 according to the present embodiment includes a printer 100 and a personal computer (PC) 200. The printer 100 includes an inkjet color printer that prints an image on a print medium (e.g., a print paper and/or a transparent film) by forming ink dots through the ejection of ink. The PC 200 provides print data to the printer 100, and serves as a print control apparatus that controls a printing operation of the printer 100. The printer 100 is connected to the PC 200 in a wired or wireless manner to exchange information. In detail, in the embodiment, the printer 100 is connected to the PC 200 through a USB cable. For example, FIG. 1 illustrates an actual printed matter (hereinafter, referred to as a "real print RP") produced by the printing of a gravure printing machine.

The printer 100 of the embodiment is a print that performs printing by using inks of the total seven colors including cyan (C), magenta (M), yellow (Y), black (K), light cyan (Lc), light magenta (Lm) and white (W). The printing system 10 of the embodiment performs a printing process of forming a color image on a transparent film as a print medium together with a white image. The transparent film, on which the color image and the white image are formed, for example, is used as a film for packaging a product.

In the present specification, a "white color" is not limited to a white color in the strict sense serving as a surface color of the object that completely reflects all wavelengths of visible light rays, and, so to speak, includes a color called a white color described as a "whitish color" in general option. A "white color", for example, represents (1) a color existing in a circle having a radius of 20 on an a*b* plane in a Lab color system and in the inner side of the circle, and existing within a color tone range in which L* is 70 or more as a result of color measurement under conditions in which the eye-one Pro manufactured by X-Rite Corporation is used as a colorimeter, a color measurement mode is spot color measurement, a light source is D50, backing is black and a print medium is a transparent film, (2) a color existing in a circle having a radius of 20 on an a*b* plane in a Lab color system and in the inner side of the circle, and existing within a color tone range in which L* is 70 or more as a result of color measurement in a white background under conditions in which CM2022 manufactured by Minolta Co., Ltd is used as a colorimeter, a measurement mode is an SCF mode, and a field of vision is D502°, or (3) a color of ink used as a background of an image as disclosed in JP-A-2004-306591. In the specification, adjusting a white color by mixing a white ink with an ink of a different color will be referred to as "white toning", and a white color (adjusted white color) generated by the white toning will be referred to as a "toned white color". Further, in the specification, an image of a white color will be referred to as a "white image" and an image formed by a toned white color of the white image will be particularly referred to as a "toned white image".

Figure 2:
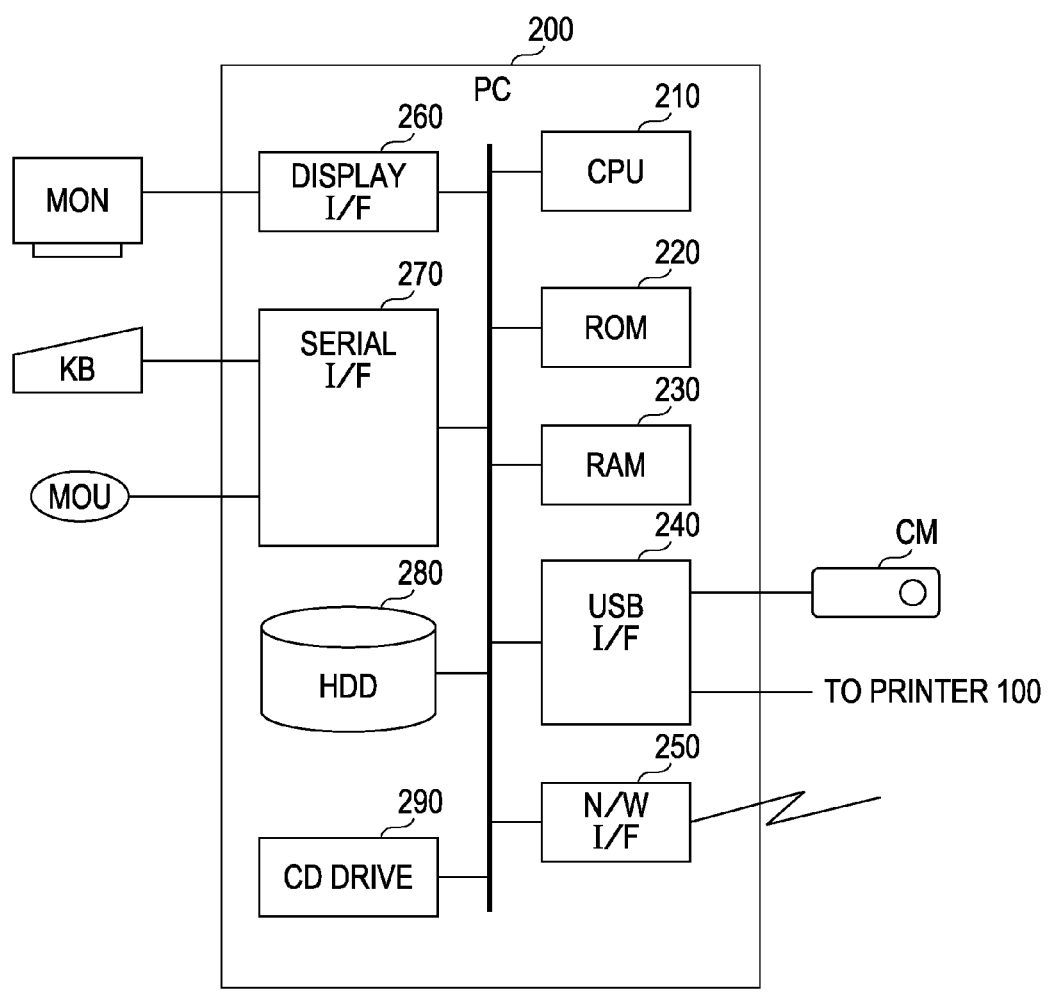
FIG. 2 is a block diagram schematically illustrating the configuration of a PC.

FIG. 2 is a block diagram schematically illustrating the configuration of the PC 200. The PC 200 includes a CPU 210, a ROM 220, a RAM 230, a USB interface (USB I/F) 240, a network interface (N/W I/F) 250, a display interface (display I/F) 260, a serial interface (serial I/F) 270, a hard disk drive (HDD) 280 and a CD drive 290. The all elements of the PC 200 are connected to each other through a bus.

A colorimeter CM compatible with a USB interface is connected to the USB interface 240 of the PC 200. A monitor MON serving as a display apparatus is connected to the display interface 260. A keyboard KB and a mouse MOU serving as input devices are connected to the serial interface 270. The configuration of the PC 200 illustrated in FIG. 2 is just one example. For example, a part of the elements of the PC 200 may be omitted or additional elements may be added thereto.

Figure 3:
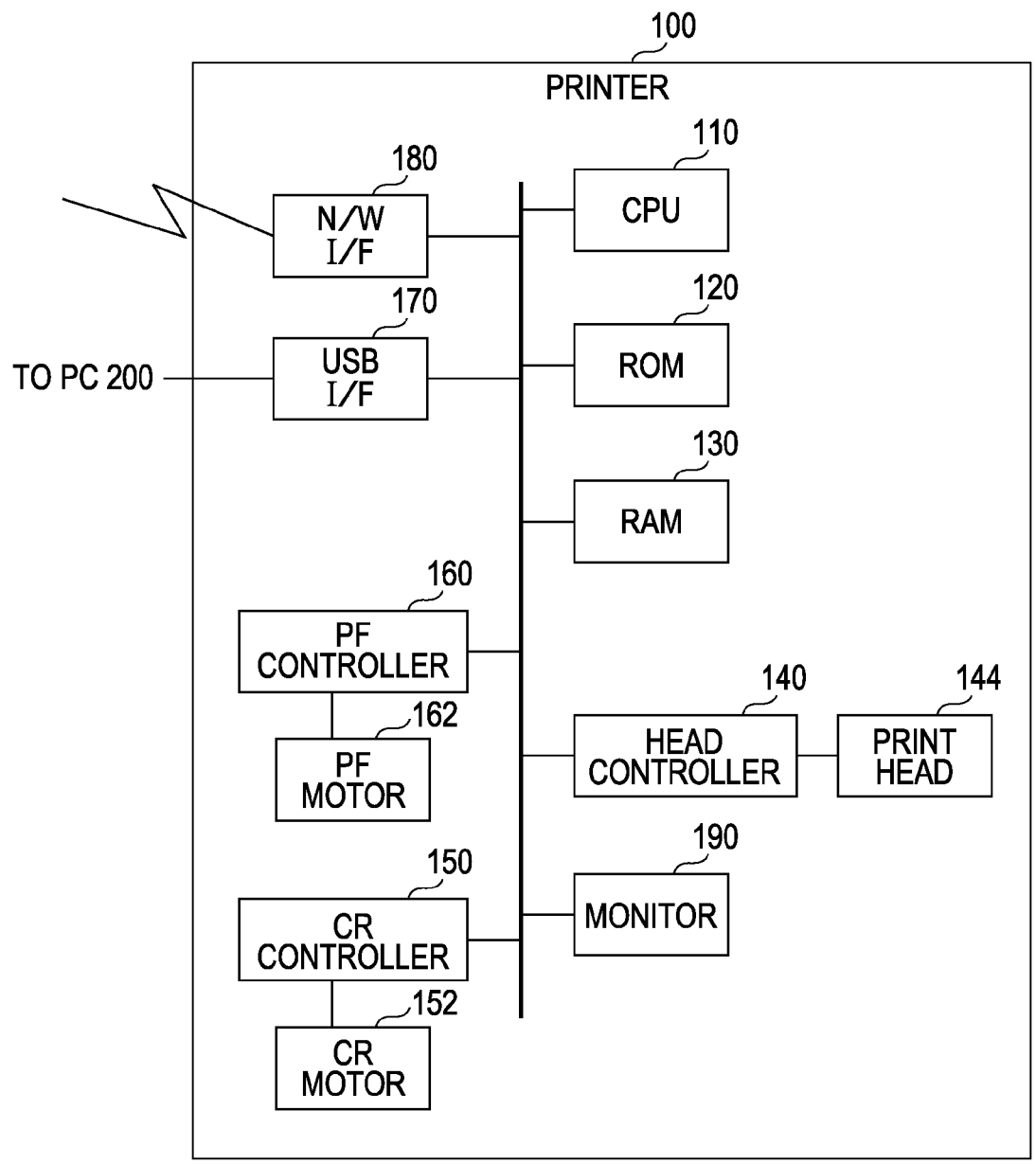
FIG. 3 is a block diagram schematically illustrating the configuration of a printer.

FIG. 3 is a block diagram schematically illustrating the configuration of the printer 100. The printer 100 includes a CPU 110, a ROM 120, a RAM 130, a head controller 140, a print head 144, a carriage controller (CR controller) 150, a carriage motor (CR motor) 152, a print medium feeding controller (PF controller) 160, a print medium feeding motor (PF motor) 162, a USB interface (USB I/F) 170, a network interface (N/W I/F) 180 and a monitor 190 serving as a display unit. The elements of the printer 100 are connected to each other through a bus.

The CPU 110 of the printer 100 serves as a control unit that controls the entire operation of the printer 100 by executing computer programs stored in the ROM 120. The print head 144 of the printer 100 is mounted on a carriage (not shown). The carriage controller 150 controls the carriage motor 152 to reciprocate the carriage in a predetermined direction. Consequently, main scanning is performed in which the print head 144 reciprocates in a predetermined direction (main scanning direction) relative to a print medium. Further, the print medium feeding controller 160 and the print medium feeding motor 162 serve as a print medium feeding mechanism. That is, the print medium feeding controller 160 controls the print medium feeding motor 162 to perform sub-scanning in which the print medium is transferred in a direction (sub-scanning direction) perpendicular to the main scanning direction. The print head 144 has a nozzle group (refer to FIG. 22) for ejecting inks, and the head controller 140 controls ink ejection from the nozzle group of the print head 144 in accordance with the main scanning and the sub-scanning Consequently, an image is formed (printed) on the print medium.

Figure 4:
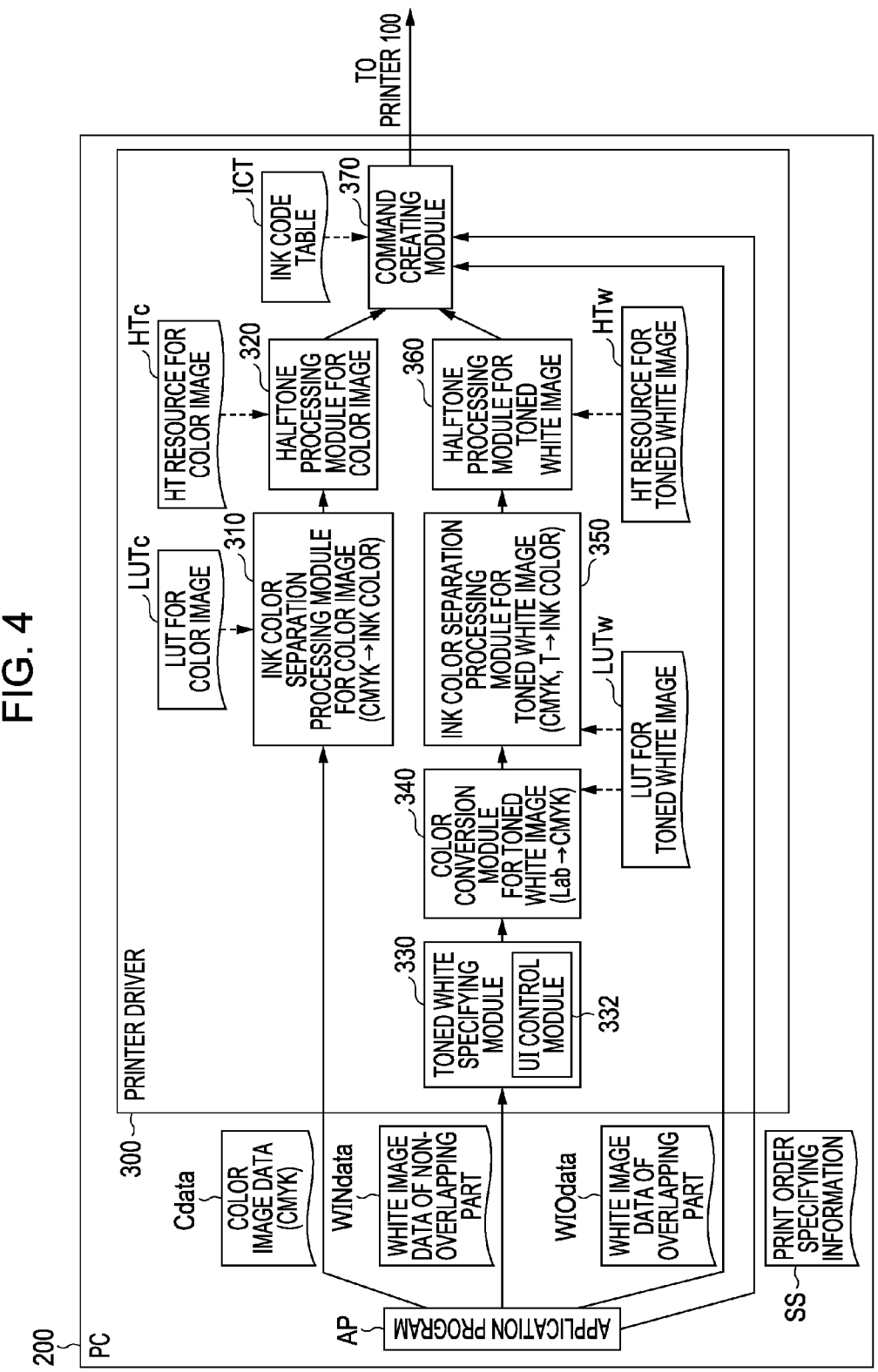
FIG. 4 is a block diagram functionally illustrating the configuration of a PC.

FIG. 4 is a block diagram functionally illustrating the configuration of the PC 200. The ROM 220 (FIG. 2) of the PC 200 stores an application program AP and a printer driver 300 as the computer programs executed by the CPU 210. The application program AP is used for generating and editing an image (hereinafter, referred to as a "printed image PI") to be printed on a transparent film as the print medium. The CPU 210 generates and edits the printed image PI by executing the application program AP.

Further, the CPU 210 executing the application program AP outputs color image data Cdata, white image data WINdata of a non-overlapping part, white image data WIOdata of an overlapping part, and printing order specifying information SS to the printer driver 300 in response to a printing execution instruction from a user. The contents of each data will be described in detail in "A-2. Printing Process".

The printer driver 300 (FIG. 4) is a program for generating print data (print command) based on the data output from the application program AP, and controlling the printer 100 (FIG. 1) based on the print data to perform a printing process. The CPU 210 (FIG. 2) controls the printing of the printer 100 by executing the printer driver 300.

As illustrated in FIG. 4, the printer driver 300 includes an ink color separation processing module 310 for a color image, a halftone processing module 320 for a color image, a toned white specifying module 330, a color conversion module 340 for a toned white image, an ink color separation processing module 350 for a toned white image, a halftone processing module 360 for a toned white image, and a command creating module 370. The toned white specifying module 330 includes a UI control module 332. Further, the HDD 280 (FIG. 2) of the PC 200 stores a look-up table (LUT) LUTc for a color image, a halftone (HT) resource HTc for a color image, a look-up table (LUT) LUTw for a toned white image, a halftone (HT) resource HTw for a toned white image, and an ink code table ICT. The printer driver 300 and each module perform predetermined processes with reference to information of the LUTc, the HTc, the LUTw, the HTw and the ICT. The function of each module and/or the contents of each information will be described in detail in "A-2. Printing Process".

Figure 5:
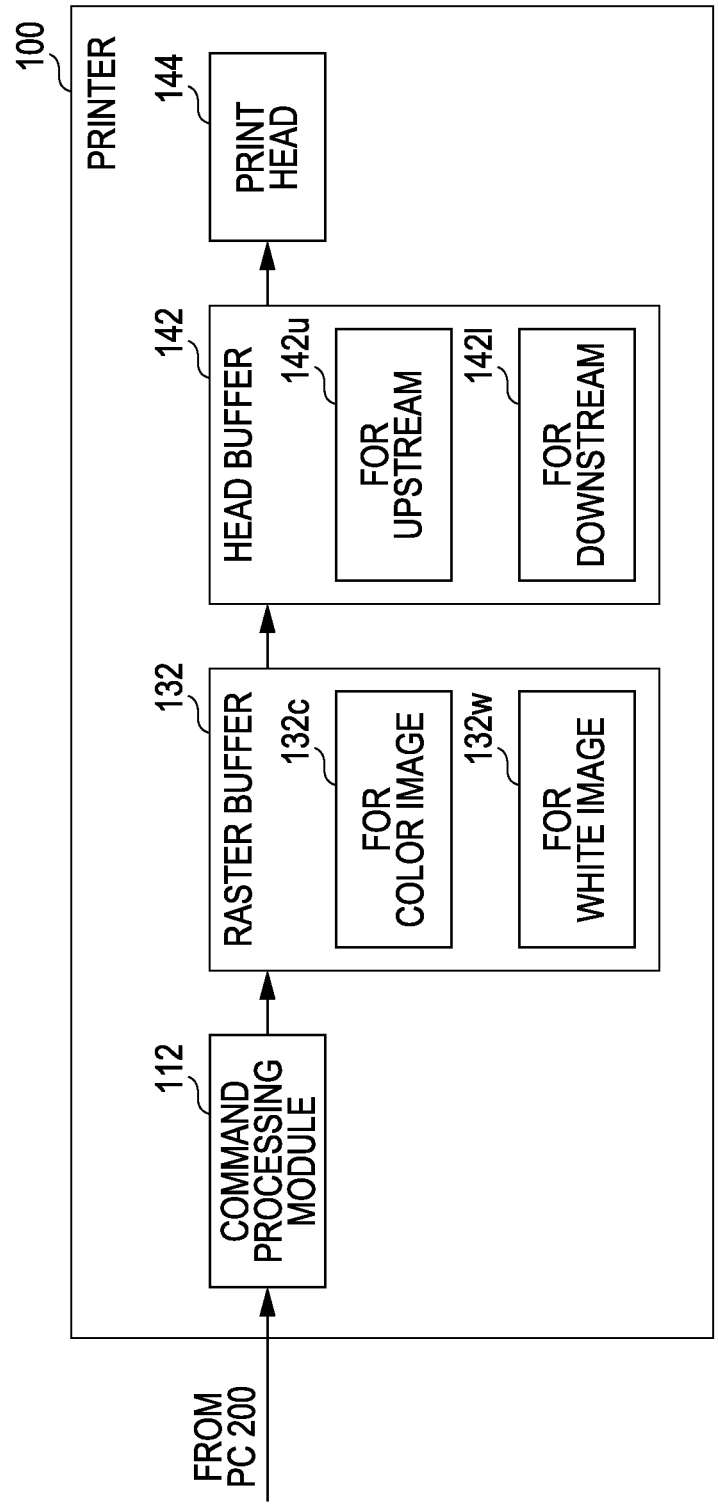
FIG. 5 is a block diagram functionally illustrating the configuration of a printer.

FIG. 5 is a block diagram functionally illustrating the configuration of the printer 100. The ROM 120 (FIG. 3) of the printer 100 stores a command processing module 112 serving as a computer program executed by the CPU 110. As described later, the CPU 110 executes a print command received from the PC 200 by executing the command processing module 112. Further, the RAM 130 (FIG. 3) of the printer 100 includes a raster buffer 132. The raster buffer 132 includes two areas of a raster buffer 132c for a color image and a raster buffer 132w for a white image. In addition, the head controller 140 (FIG. 3) of the printer 100 includes a head buffer 142. The head buffer 142 includes an upstream head buffer 142u and a downstream head buffer 142l. The function and detailed configuration of these programs and/or buffers will be described in detail in "A-2. Printing Process".

A-2. Printing Process

Figure 6:
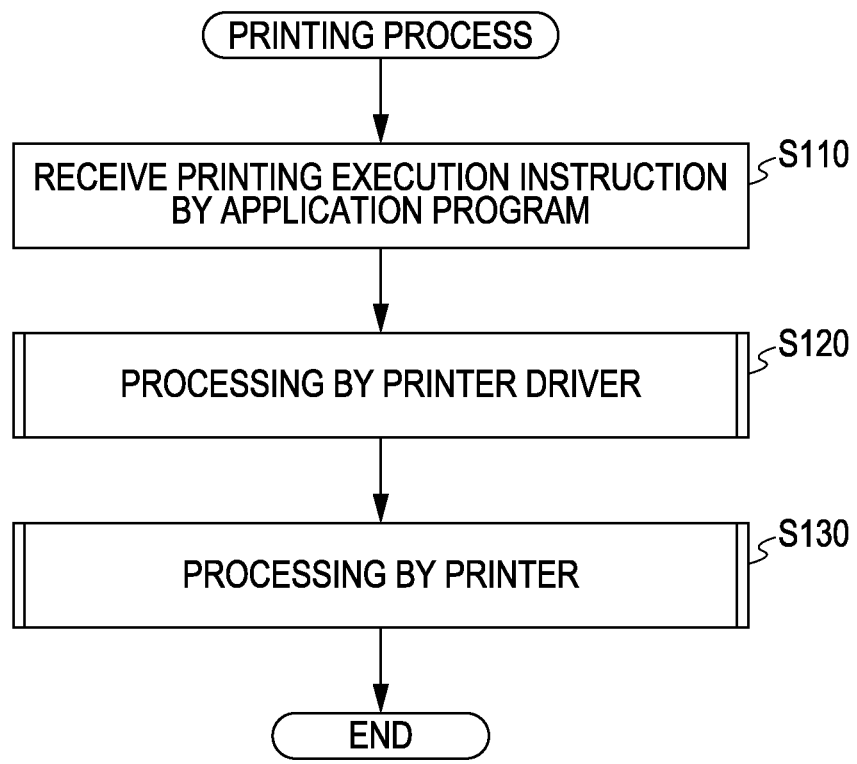
FIG. 6 is a flowchart illustrating the flow of a printing process performed in a printing system of the embodiment.

FIG. 6 is a flowchart illustrating the flow of a printing process performed in the printing system 10 of the embodiment. According to the printing process of the embodiment, after a color image is formed on a transparent film as a print medium together with a white image, a printed matter including the color image and the white image is created. Further, the color image corresponds to a first image according to the invention and the white image corresponds to a second image according to the invention.

In Step S110 (FIG. 6), the CPU 210 (FIG. 2) executing the application program AP (FIG. 4) receives a printing execution instruction from a user. The CPU 210 outputs the color image data Cdata, the white image data WINdata of the non-overlapping part, the white image data WIOdata of the overlapping part, and the printing order specifying information SS to the printer driver 300 in response to the reception of the printing execution instruction (FIG. 4). The color image data Cdata represents a color image in the printed image PI, the white image data WINdata of the non-overlapping part specifies a non-overlapping white area Awn (which will be described later) in the printed image PI, the white image data WIOdata of the overlapping part specifies an overlapping white area Awo (which will be described later) in the printed image PI, and the printing order specifying information SS specifies a printing order (which will be described later) of the color image and the white image in an overlap part of the color image and the white image.

Figure 7A:
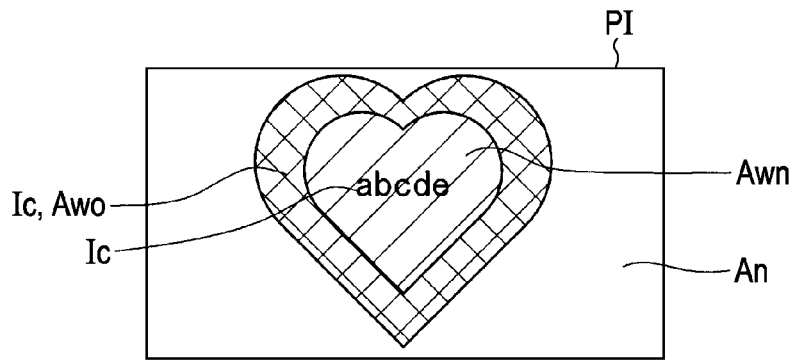
FIGS. 7A to 7D are diagrams illustrating one example of a printed image, color image data, white image data of a non-overlapping part, and white image data of an overlapping part.

FIGS. 7A to 7D are diagrams illustrating one example of the printed image PI, the color image data Cdata, the white image data WINdata of the non-overlapping part, and the white image data WIOdata of the overlapping part. FIG. 7A illustrates one example of the printed image PI. The printed image PI includes a diagram image and an character image ("abcde" of FIG. 7A) as a color image Ic. Further, the printed image PI includes a white area (the non-overlapping white area Awn and the overlapping white area Awo) and a non-white area An. The white area is an area (in which a white image is to be formed during printing) corresponding to the white image, and the non-white area An is an area (in which the white image is not to be formed during the printing) other than the area corresponding to the white image.

According to the embodiment, an area in which the color image Ic is arranged in the printed image PI is set as the white area. Thus, during the printing, the color image is always formed to overlap the white image. This is for preventing an opposite side of the printed matter from being transparent via the transparent file as the print medium in the position of the color image Ic. Further, during the printing, neither the color image nor the white image are formed on an area corresponding to the non-white area An of the print medium, and the ground color of the print medium is shown on the area.

The overlapping white area Awo overlaps the color image Ic in the white area. In detail, in the embodiment, the overlapping white area Awo overlaps the color image Ic, except for the character image, in the white area. Thus, in the printed image PI illustrated in FIG. 7A, the overlapping white area Awo indicates an area (cross-hatched area) between double heart-shaped lines. In the embodiment, during the printing, the white image is formed on the area of the print medium, which corresponds to the overlapping white area Awo, by using only a white ink. The overlapping white area Awo corresponds to a first part of the second image (white image) according to the invention.

Further, the non-overlapping white area Awn does not overlap the color image Ic in the white area. In detail, in the embodiment, the non-overlapping white area Awn does not overlap the color image Ic, except for the character image, in the white area. Thus, in the printed image PI illustrated in FIG. 7A, the non-overlapping white area Awn indicates an area (single-hatched area) surrounded by an inside one of the double heart-shaped lines. In the embodiment, during the printing, a toned white image, which is a white image formed by a toned white color, is formed on the area of the print medium, which corresponds to the non-overlapping white area Awn. The non-overlapping white area Awn corresponds to a second part of the second image (white image) according to the invention.

Figure 7B:
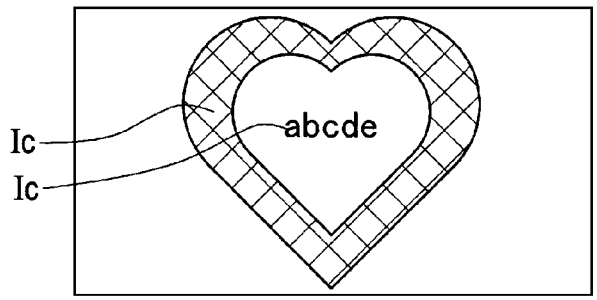

FIG. 7B schematically illustrates the color image data Cdata. In the embodiment, the color image data Cdata is for specifying colors of each pixel of the printed image PI by using a C value of 8 bits, an M value of 8 bits, a Y value of 8 bits and a K value of 8 bits when focusing only on the color image Ic of the printed image PI. In relation to the color image data Cdata, values of pixels corresponding to the color image Ic of the printed image PI are used for specifying the color of the color image Ic, and values of remaining pixels indicate values (e.g., C, M, Y and K are 0) representing that the color image is not formed.

Figure 7C:
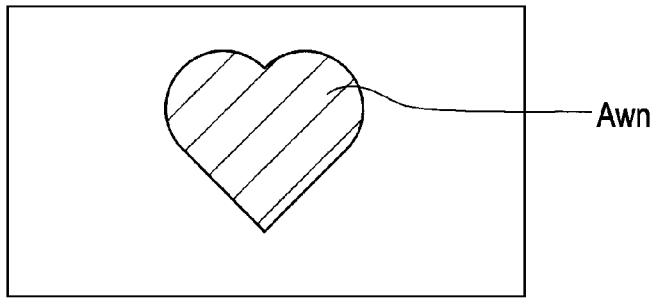

FIG. 7C schematically illustrates the white image data WINdata of the non-overlapping part. In the embodiment, the white image data WINdata of the non-overlapping part is for specifying colors of each pixel of the non-overlapping white area Awn of the printed image PI by using a W value of 8 bits when excluding the color image Ic from the printed image PI. Herein, any one of 0 and 255 is obtained as the W value. In relation to the white image data WINdata of the non-overlapping part, values of pixels corresponding to the non-overlapping white area Awn of the printed image PI indicate a value (e.g., W=255) representing that the white image is formed, and values of remaining pixels indicate a value (e.g., W=0) representing that the white image is not formed. Further, the white image data WINdata of the non-overlapping part may be expressed by a value of 2 bits with respect to each pixel.

Figure 7D:
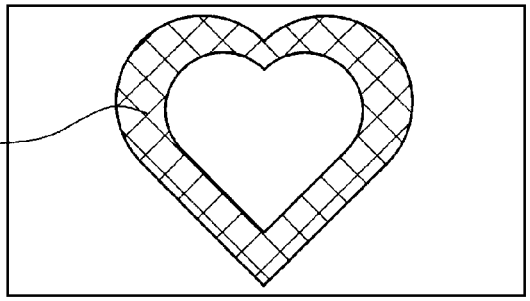

FIG. 7D schematically illustrates the white image data WIOdata of the overlapping part. In the embodiment, the white image data WIOdata of the overlapping part is for specifying colors of each pixel of the overlapping white area Awo of the printed image PI by using a W value of 8 bits when excluding the color image Ic from the printed image PI. Herein, any one of 0 and 255 is obtained as the W value. In relation to the white image data WIOdata of the overlapping part, values of pixels corresponding to the overlapping white area Awo of the printed image PI indicate a value (e.g., W=255) representing that the white image is formed, and values of remaining pixels indicate a value (e.g., W=0) representing that the white image is not formed. Further, the white image data WIOdata of the overlapping part may be expressed by a value of 2 bits with respect to each pixel.

Figure 8A:
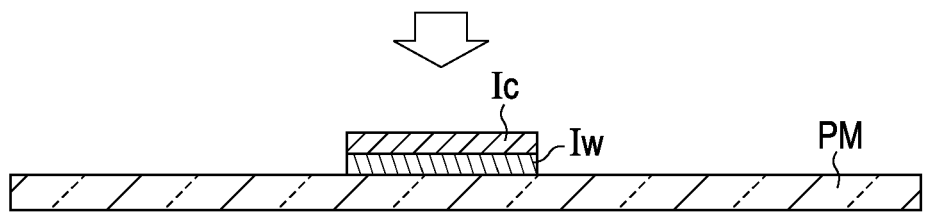
FIGS. 8A and 8B are diagrams illustrating a printing order of a color image and a white image.
Figure 8B:
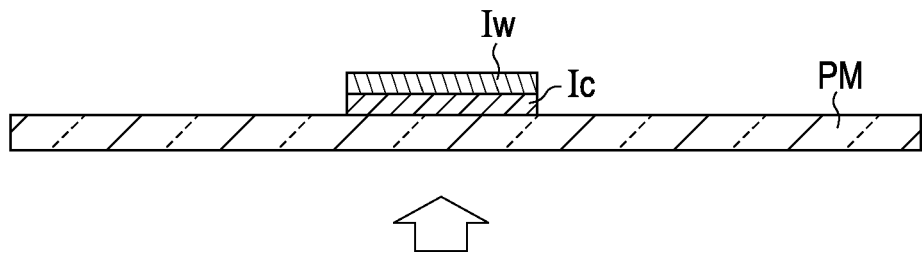

FIGS. 8A and 8B are diagrams illustrating a printing order of a color image and a white image. FIG. 8A illustrates a printing order in which the white image Iw is formed on a transparent film as a print medium PM and the color image Ic is formed on the white image Iw. In the specification, this printing order will be referred to as "white-color print" or "W-C print". In the W-C print illustrated in FIG. 8A, an observer observes a printed matter from the upper portion of FIG. 8A (refer to the arrow of FIG. 8A).

FIG. 8B illustrates a printing order in which the color image Ic is formed on the transparent film as the print medium PM and the white image Iw is formed on the color image Ic. In the specification, this printing order will be referred to as "color-white print" or "C-W print". In the C-W print illustrated in FIG. 8B, an observer observes a printed matter from the lower portion of FIG. 8B (refer to the arrow of FIG. 8B).

A user selects the W-C print or the C-W print according to the purpose of the printed matter. The CPU 210 executing the application program AP generates the printing order specifying information SS for specifying the printing order selected by the user, and outputs the printing order specifying information SS to the printer driver 300 (FIG. 4).

Figure 9:
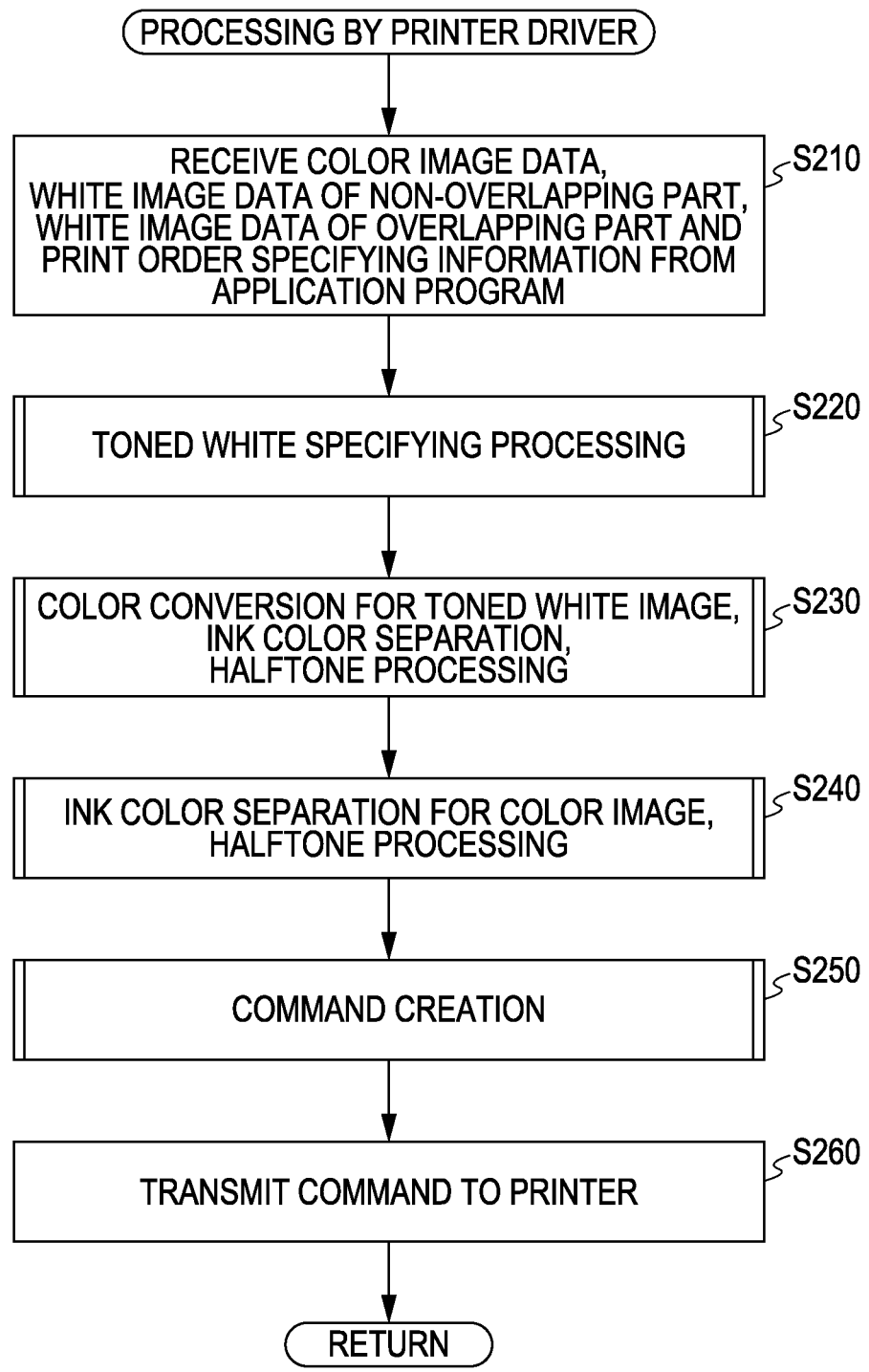
FIG. 9 is a flowchart illustrating the flow of the processing performed by a CPU executing a printer driver.

In Step S120 of the printing process (FIG. 6), a processing by the CPU 210 executing the printer driver 300 (FIG. 4) is performed. FIG. 9 is a flowchart illustrating the flow of the processing performed by the CPU 210 executing the printer driver 300. In Step S210, the CPU 210 receives the color image data Cdata, the white image data WINdata of the non-overlapping part, the white image data WIOdata of the overlapping part, and the printing order specifying information SS, which are output from the application program AP (refer to FIG. 4).

Figure 10:
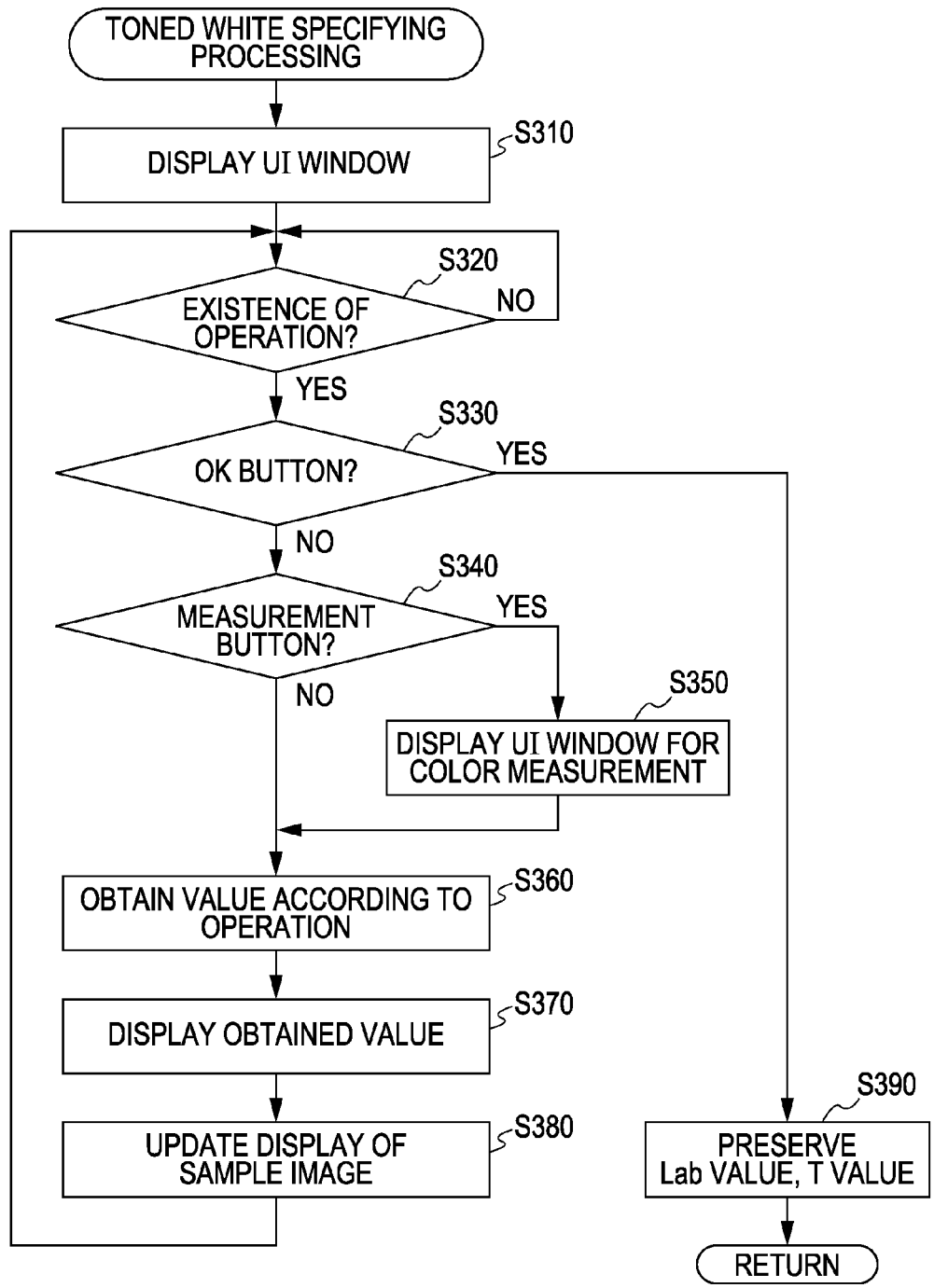
FIG. 10 is a flowchart illustrating the flow of a toned white specifying processing.

In Step S220 (FIG. 9), the toned white specifying module 330 (FIG. 4) performs a toned white specifying processing for specifying a color of the white image (toned white image) formed on the area of the print medium corresponding to the non-overlapping white area Awn (refer to FIG. 7A) of the printed image PI. FIG. 10 is a flowchart illustrating the flow of the toned white specifying processing. In Step S310, the UI control module 332 (FIG. 4) of the toned white specifying module 330 displays a UI window for specifying a toned white color on the monitor MON (FIG. 2) of the PC 200.

Figure 11A:
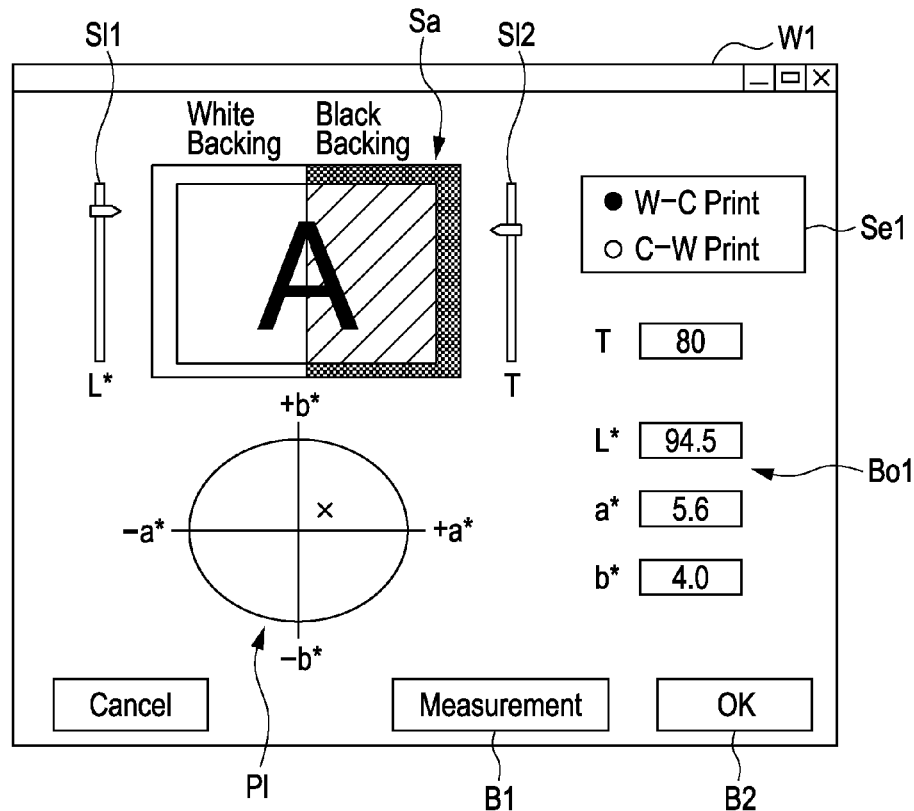
FIGS. 11A and 11B are diagrams illustrating one example of a UI window for specifying a toned white color.
Figure 11B:
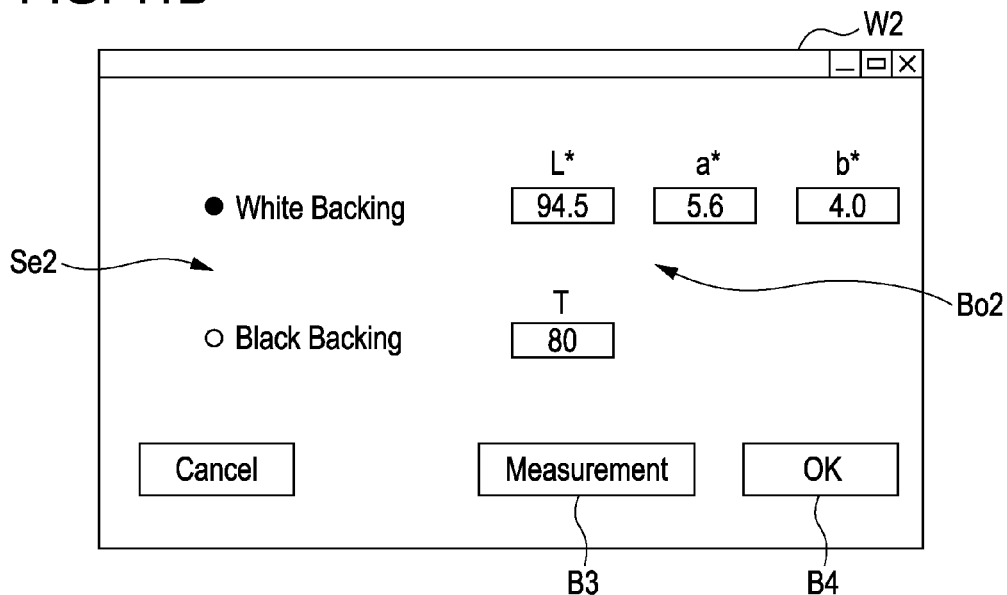

FIGS. 11A and 11B are diagrams illustrating one example of the UI window for specifying the toned white color. As illustrated in FIG. 11A, the UI window W1 for specifying the toned white color includes a sample image display area Sa, two slider bars Sl1 and Sl2, an ab plane display area Pl, a printing order specifying section Se1, a value input box Bo1, a measurement button B1 and an OK button B2.

In the UI window W1 for specifying the toned white color illustrated in FIG. 11A, the sample image display area Sa displays a sample image of the specified toned white color. The sample image display area Sa is divided into two areas from side to side, in which the left side is an area (white backing area) indicating a toned white color in white backing, and the right side is an area (black backing area) indicating a toned white color in black backing Further, the outermost peripheral portion of the sample image display area Sa is an area (background color area) indicating a background color (a white color or a black color), and an area inside the background color area is an area (white image area) indicating a tone white color. In addition, a color image (image "A" of FIG. 11A) is displayed in the vicinity of the center of the sample image display area Sa such that the image "A" is formed in both the white backing area and the black backing area. The color and/or shape of the color image may be arbitrarily set.

In the UI window W1 for specifying the toned white color, the value input box Bo1 is used for specifying a toned white color by the input of a color value (L*value, hereinafter, simply referred to also as an "L value") in an L*a*b color system, an a*value (hereinafter, simply referred to also as an "a value"), b*value (hereinafter, simply referred to also as an "b value"), and a T value. The L value represents the brightness of the toned white color, and relates to the amount of a black (K) ink when printing the toned white image. The a value and the b value represent chromaticity along a red-green axis and a yellow-blue axis of the toned white color, and relates to the amount of a color ink when printing the toned white image. The T value represents concentration and relates to the amount of ink per a unit area when printing the toned white image. That is, the T value relates to the transmittance of the background color.

In the UI window W1 for specifying the toned white color, the slider bars Sl1 and Sl2 and the ab plane display area Pl are used for specifying the toned white color by the input of the Lab value and the T value.

Further, in the UI window W1 for specifying the toned white color, the printing order specifying section Se1 is used for specifying the printing order as described above. The printing order is set by the application program AP, and the printing order specifying information SS for specifying the printing order is output to the printer driver 300 from the application program AP (refer to FIG. 4). The printing order specifying section Se1 shows whether the printing order specified by the printing order specifying information SS is the W-C print or the C-W print. In addition, in the UI window W1 for specifying the toned white color, change (specifying of a new printing order) of the printing order shown in the printing order specifying section Se1 can be specified.

Further, when the UI window W1 for specifying the toned white color is displayed for the first time, the display states of the value input box Bo1, the sample image display area Sa and the like correspond to a default toned white color. For example, a default state is a display state corresponding to the Lab value and the T value set in advance as the color of a white ink of the printer 100.

When the UI window W1 for specifying the toned white color is displayed, the UI control module 332 (FIG. 4) monitors whether the keyboard KB and/or the mouse MOU (FIG. 2) are operated by a user (Step S320 of FIG. 10). When it is determined that the keyboard KB and/or the mouse MOU (FIG. 2) are operated (Step S320: Yes) and the OK button B2 and the measurement button B1 are not operated (Step S330: No and Step S340: No), the UI control module 332 obtains a value corresponding to the operation (Step S360), displays the obtained value on the value input box Bo1 and the like (Step S370), and updates the display of the sample image display area Sa (Step S380).

For example, if a user selects the value input box Bo1 and inputs a value by operating the keyboard KB (FIG. 2), the input value is displayed on the value input box Bo1 and the color of the sample image display area Sa is changed to a color (toned white color) specified by the input value. Then, if the user changes the a value and/or the b value on the value input box Bo1, the color tone of the color (toned white color) of the white image area of the sample image display area Sa is changed. Further, if the user changes the L value on the value input box Bo1, the brightness of the color of the white image area of the sample image display area Sa is changed. When the user changes the T value on the value input box Bo1, the transmittance of the background color is changed, so the brightness of the white image area in the black backing area of the sample image display area Sa is changed. However, the color of the white image area in the white backing area is not changed. Consequently, the change in the color according to the change of the T value (concentration value) can be easily confirmed by comparing the black backing area with the white backing area in the sample image display area Sa, and the user can specify the toned white color more accurately and easily.

Further, for example, if the user changes the position of the slider bar Sl1 by operating the mouse MOU (FIG. 2), an L value corresponding to the changed position is obtained, so the color of the sample image display area Sa is changed to a color specified by the obtained value. Similarly to this, if the user changes the position of the slider bar Sl2 by operating the mouse MOU, a T value corresponding to the changed position is obtained, so the color of the sample image display area Sa is changed. Further, if the user changes the position of a specified point (indicated by x of FIG. 11A) of the ab plane display area Pl by operating the mouse MOU, an a value and a b value corresponding to the changed position of the specified point x are obtained, so the color of the sample image display area Sa is changed.

In addition, the value input box Bo1, the slider bars Sl1 and Sl2 and the ab plane display area Pl work in cooperation with each other. That is, if a value on the value input box Bo1 is changed, the positions of the slider bars Sl1 and Sl2 and/or the position of the specified point x in the ab plane display area Pl are changed. Similarly to this, if the positions of the slider bars Sl1 and Sl2 and/or the position of the specified point x in the ab plane display area Pl are changed, changed specified values are displayed on the value input box Bo1.

In the embodiment, the toned white color can be specified based on the color measurement result of the real print RP (refer to FIG. 1). The toned white color is specified based on the color measurement result of the real print RP, so that it is possible to perform a printing process of reliably reproducing the color of the white part of the real print RP.

Figure 12A:
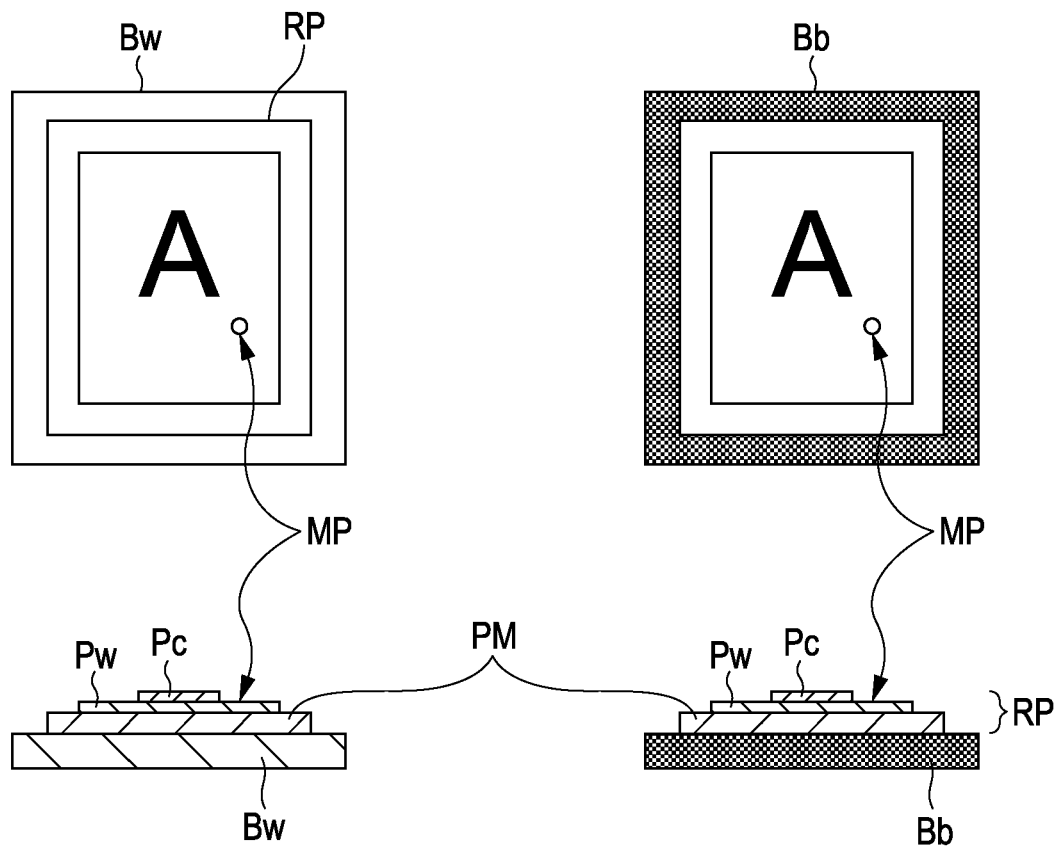
FIGS. 12A and 12B are diagrams illustrating a color measurement method of a real print.
Figure 12B:
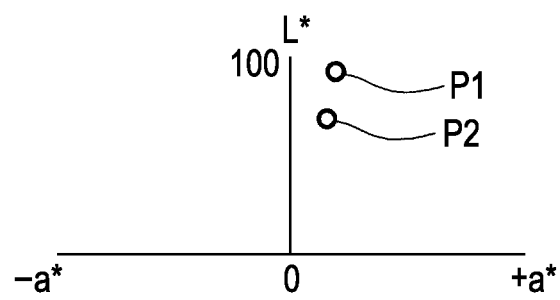

FIGS. 12A and 12B are diagrams illustrating a color measurement method of the real print RP. The real print RP denotes a printed matter on which an image of a white part Pw and an image of a color part Pc are formed on the print medium PM. As illustrated in FIG. 12A, the color measurement is performed by setting an arbitrary point of the white part Pw of the real print RP as a measurement point MP, and measuring values (Lab value and T value) representing the color of the measurement point MP by using the colorimeter CM (FIG. 2). The color measurement method includes white-backing color measurement of measuring the color of the real print RP mounted on the white backing Bw, and black-backing color measurement of measuring the color of the real print RP mounted on the black backing Bb. As illustrated in FIG. 12B, in the white-backing color measurement and the black-backing color measurement, the measured values (L values) may be different from each other due to the concentration of the white part Pw of the real print RP. In the embodiment, the white-backing color measurement is performed to obtain the Lab value and the black-backing color measurement is performed to obtain the T value. Consequently, it is possible to specify the toned white color more accurately and easily.

When it is determined that the keyboard KB and/or the mouse MOU are operated (Step S320: Yes) in Step S320 of FIG. 10, the OK button B2 is not operated (Step S330: No), and the measurement button B1 is operated (Step S340: Yes), the UI control module 332 (FIG. 4) displays a UI window W2 for color measurement illustrated in FIG. 11B on the monitor MON (FIG. 2) of the PC 200 (Step S350).

The UI window W2 for color measurement (FIG. 11B) denotes a UI window for specifying the toned white color by measuring the color of the real print RP. The UI window W2 for color measurement includes a background selection area Se2, a color measurement value display box Bo2, a measurement button B3 and an OK button B4. The background selection area Se2 is used for selecting any one of the white-backing color measurement and the black-backing color measurement. After the user selects the color measurement method from the background selection area Se2 and selects the measurement button B3, the user performs color measurement by using the selected method. In relation to the color measurement, the white-backing color measurement and the black-backing color measurement may be sequentially performed, or only one of the white-backing color measurement and the black-backing color measurement may be performed. If the color measurement is completed, a value (at least one of the Lab value and the T value) based on the color measurement result is obtained (Step S360 of FIG. 10), and is displayed on the color measurement value display box Bo2 (Step S370). If the user selects the OK button B4, the UI window W1 (FIG. 11A) for specifying the toned white color is displayed again. At this time, the display state of the sample image display area Sa, the value input box Bo1 and the like of the UI window W1 for specifying the toned white color is changed based on the color measurement result (Step S380). In addition, after the color measurement is performed, the user can correct the value (the Lab value and the T value), which is obtained based on the color measurement result, on the UI window W1 for specifying the toned white color.

When it is determined that the keyboard KB and/or the mouse MOU are operated (Step S320: Yes) in Step S320 of FIG. 10 and the OK button B2 is operated (Step S330: Yes), the UI control module 332 (FIG. 4) sets a color, which is specified by the Lab value and the T value obtained and displayed at that time, as a color of a toned white image, and then preserves the Lab value and the T value (Step S390). Through the above processes, the user can specify the color of the toned white image accurately and easily. Particularly, the Lab value and the T value of the toned white image are specified based on the color measurement result by the colorimeter CM, the color of the toned white image more accurately and more easily. Further, in the embodiment, the toned white color is specified by the Lab value and the T value, so that the value of a color including the concentration of the toned white image can be accurately specified. Further, in the UI window W1 for specifying the toned white color according to the embodiment, the specified color is displayed on the sample image display area Sa, so that the user can easily specify a color while checking the displayed color.

Then, the preserved Lab and T values are combined with the white image data WINdata of the non-overlapping part (refer to FIG. 7C). That is, in relation to the white image data WINdata of the non-overlapping part, the Lab value and the T value are allowed to correspond to pixels to which data (W=255) representing formation of the white image is allocated. In the specification, the white image data WINdata of the non-overlapping part, to which the Lab value and the T value are allowed to correspond, will be referred to as toned white image data.

Figure 13:
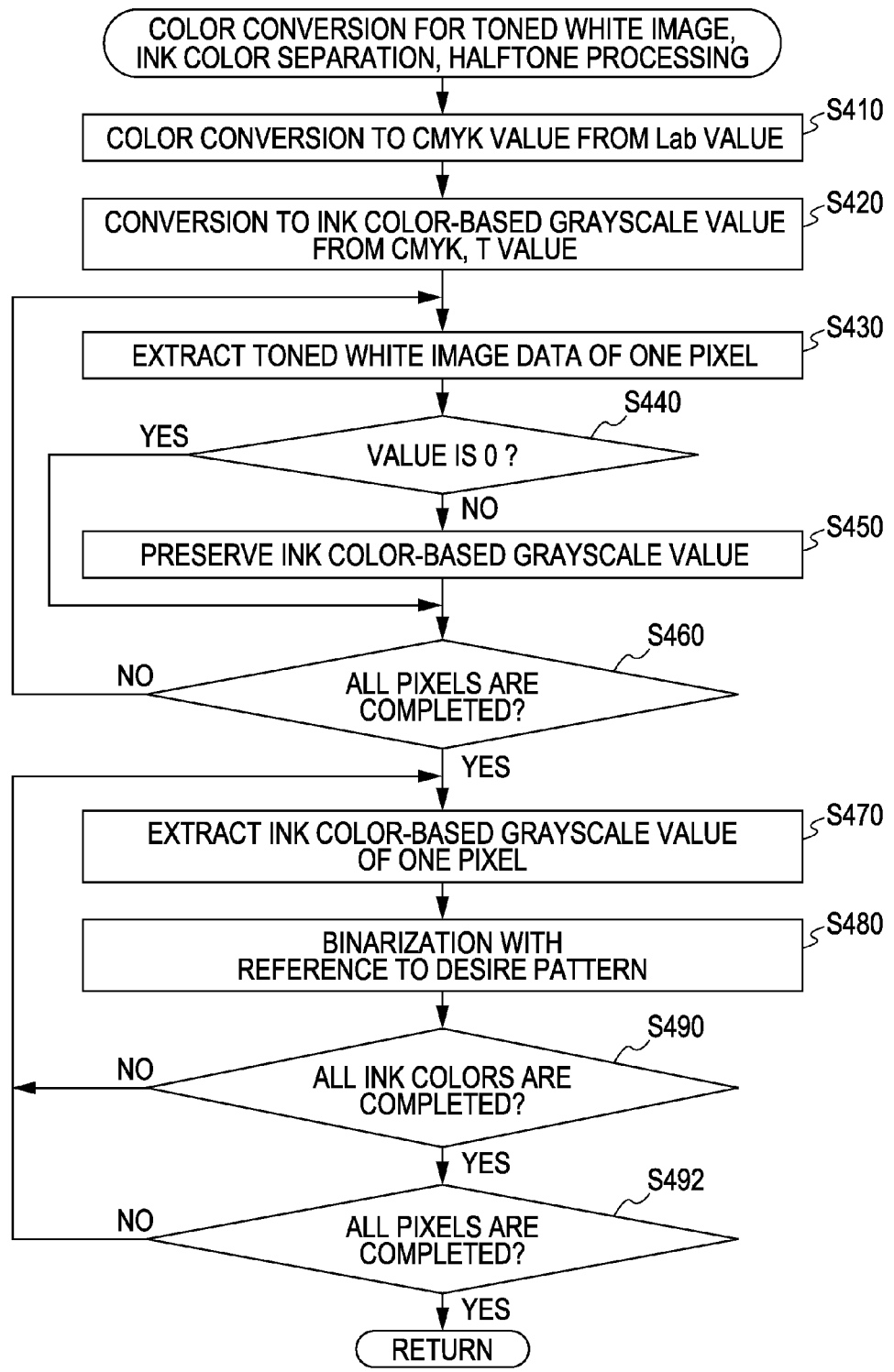
FIG. 13 is a flowchart illustrating the flow of a color conversion processing for a toned white image, an ink color separation processing and a halftone processing.

In Step S230 of the processing (FIG. 9) performed by the printer driver 300, the printer driver 300 performs a color conversion processing for the toned white image, an ink color separation processing and a halftone processing. FIG. 13 is a flowchart illustrating the flow of the color conversion processing for the toned white image, the ink color separation processing and the halftone processing. In Step S410, the color conversion module 340 for the toned white image (FIG. 4) converts the Lab value preserved in Step S390 of the toned white specifying processing (FIG. 10) into a CMYK value. The color conversion is performed with reference to the look-up table LUTw (FIG. 4) for the toned white image.

FIGS. 14A and 14B are tables partially illustrating one example of the look-up table LUTw for the toned white image. FIG. 14A illustrates a look-up table LUTw1 for the toned white image referred when the color conversion to the CMYK value from the Lab value is performed. As illustrated in FIG. 14A, the look-up table LUTw1 for the toned white image shows the correspondence relationship between the preset Lab value and the CMYK value. In detail, referring to the look-up table LUTw1 for the toned white image, each grayscale value of CMYK has a value in the range of 0 to 100. The color conversion module 340 for the toned white image converts the Lab value into the CMYK value with reference to the look-up table LUTw1 for the toned white image.

In Step S420 (FIG. 13), the ink color separation processing module 350 (FIG. 4) for the toned white image performs an ink color separation processing of converting the combination of the CMYK value decided in Step S410 and the T value preserved in Step S390 of the toned white specifying processing (FIG. 10) into an ink color-based grayscale value. As described above, the printer 100 of the embodiment performs printing by using inks of the total seven colors including cyan (C), magenta (M), yellow (Y), black (K), light cyan (Lc), light magenta (Lm) and white (W). Thus, according to the ink color separation processing, the combination of the CMYK value and the T value is converted into the respective grayscale values of the seven ink colors. The ink color separation processing is also performed with reference to the look-up table LUTw (FIG. 4) for the toned white image. FIG. 14B illustrates a look-up table LUTw2 for the toned white image referred when the combination of the CMYK value and the T value is converted into the ink color-based grayscale value. As illustrated in FIG. 14B, the look-up table LUTw2 for the toned white image shows the correspondence relationship between the combination of the preset CMYK value and the T value and the respective grayscale values of the ink colors. In detail, referring to the look-up table LUTw2 for the toned white image, the grayscale values of the ink colors have values in the range of 0 to 255. The ink color separation processing module 350 for the toned white image converts the combination of the CMYK value and the T value into the ink color-based grayscale value with reference to the look-up table LUTw2 for the toned white image.

Further, as illustrated in FIG. 14B, in the embodiment, as for the white toning (representing the adjustment of a white color through the mixing of a white ink and an ink of a different color), ink of four colors including yellow (Y), black (K), light cyan (Lc) and light magenta (Lm) are used while inks of two colors including cyan (C) and magenta (M) are not used among inks of six colors except for a white color. That is, as for the white toning, a light-colored ink is used with respect to the same color tone instead of a dark-colored ink.

In Step S430 (FIG. 13), the ink color separation processing module 350 (FIG. 4) for the toned white image extracts data of one pixel in the toned white image data. In Step S440, the ink color separation processing module 350 for the toned white image determines whether the extracted pixel value is a value (0) representing that the toned white image is not formed or a value (255) representing that the toned white image is formed. When it is determined that the pixel value is 255 (Step S440: No), the ink color separation processing module 350 for the toned white image preserves the ink color-based grayscale value decided in Step S420 (Step S450). Meanwhile, when it is determined that the pixel value is 0 (Step S440: Yes), Step S450 is omitted.

Steps S430, S440 and S450 of FIG. 13 are repeated until the process for all pixels of the toned white image data is completed (refer to Step S460). When the process for all pixels is completed (Step S460: Yes), the halftone processing module 360 for the toned white image (FIG. 4) extracts an ink color-based grayscale value of one pixel (Step S470), and performs a binarization processing (halftone processing) with reference to a desire pattern for each ink color (Step S480). The binarization processing is performed with reference to the halftone resource HTw (FIG. 4) for the toned white image set in advance. The halftone resource HTw for the toned white image may be set by focusing on filling of dots in the toned white image. The binarization processing is repeated until the process for all ink colors of is completed (refer to Step S490). Further, Steps S470, S480 and S490 are repeated until the process for all pixels is completed (refer to Step S492).

The color conversion processing for the toned white image, the ink color separation processing and the halftone processing of FIG. 13 are performed, so that it is possible to generate dot data for the toned white image, which is used for defining ON/OFF of dots of each ink color of each pixel when the toned white image is formed.

Figure 15:
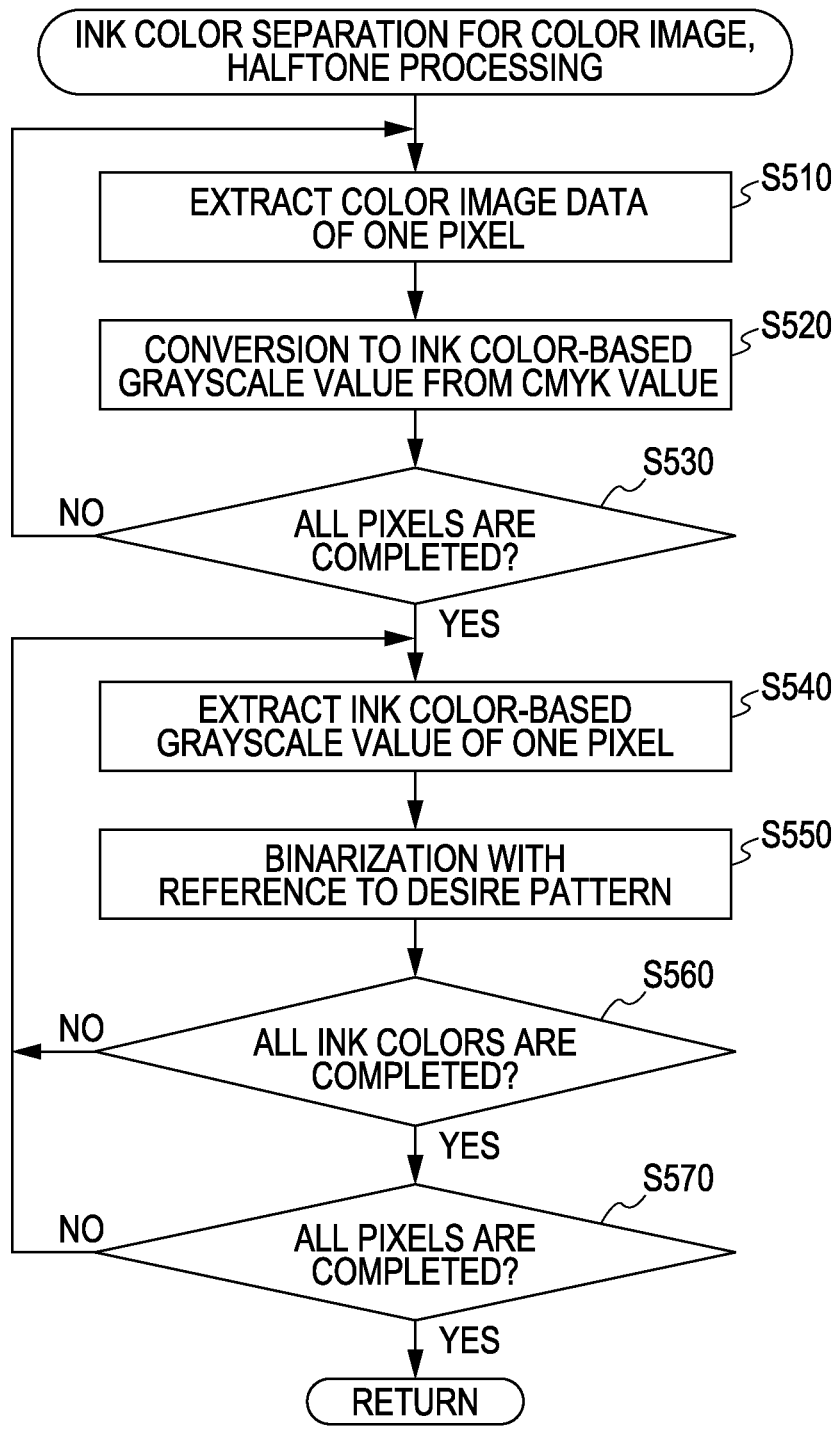
FIG. 15 is a flowchart illustrating the flow of a color conversion processing for a white image formed with a desired color, an ink color separation processing and a halftone processing.

In Step S240 of the processing (FIG. 9) performed by the printer driver 300, the printer driver 300 performs a color conversion processing for a color image, an ink color separation processing and a halftone processing. FIG. 15 is a flowchart illustrating the flow of the color conversion processing for the white image formed with a desired color, the ink color separation processing and the halftone processing. In Step S510, the ink color separation processing module 310 (FIG. 4) for the color image extracts data of one pixel in the color image data. In Step S520, the ink color separation processing module 310 for the color image performs the ink color separation processing of converting the extracted data (CMYK value) of one pixel into an ink color-based grayscale value. As described above, the printer 100 of the embodiment performs printing by using inks of the total seven colors including cyan (C), magenta (M), yellow (Y), black (K), light cyan (Lc), light magenta (Lm) and white (W). Thus, according to the ink color separation processing, the CMYK value is converted into the respective grayscale values of the seven ink colors. The ink color separation processing is also performed with reference to the look-up table LUTc (FIG. 4) for the color image.

FIG. 16 is a table partially illustrating one example of the look-up table LUTc for the color image. As illustrated in FIG. 16, the look-up table LUTc for the color image shows the correspondence relationship between the preset CMYK value and the respective grayscale values of the ink colors. In detail, referring to the look-up table LUTc for the color image, each grayscale value of CMYK has a value in the range of 0 to 100 and the grayscale values of the ink colors have values in the range of 0 to 255. The ink color separation processing module 310 for the color image converts the CMYK value to the ink color-based grayscale value with reference to the look-up table LUTc for the color image. In addition, as illustrated in FIG. 16, according to the embodiment, for the formation of the color image, inks of six colors except for the white color are used and the white ink is not used.

Steps S510 and S520 of FIG. 15 are repeated until the process for all pixels of the color image data is completed (refer to Step S530). When the process for all pixels is completed (Step S530: Yes), the halftone processing module 320 (FIG. 4) for the color image extracts an ink color-based grayscale value of one pixel (Step S540) and performs a binarization processing (halftone processing) with reference to a desire pattern for each ink color (Step S550). The binarization processing is performed with reference to the halftone resource HTc (FIG. 4) for the color image set in advance. The halftone resource HTc for the color image may be set by focusing on suppression of graininess. The binarization processing is repeated until the process for all ink colors of is completed (refer to Step S560). Further, Steps S540, S550 and S560 are repeated until the process for all pixels is completed (refer to Step S570).

The color conversion processing for the color image, the ink color separation processing and the halftone processing of FIG. 15 are performed, so that it is possible to generate dot data for the color image, which is used for defining ON/OFF of dots of each ink color of each pixel when the color image is formed.

In Step S250 of the processing (FIG. 9) performed by the printer driver 300, the command creating module 370 (FIG. 4) of the printer driver 300 performs a command creation process. According to the command creation process, a print command for controlling the printing process by the printer 100 is generated based on the dot data for the toned white image and the dot data for the color image generated in the halftone processing (Steps S230 and S240 of FIG. 9) for the toned white image and the color image, and the white image data WIOdata of the overlapping part and the printing order specifying information SS (refer to FIG. 4) which are output from the application program AP.

Figure 17:
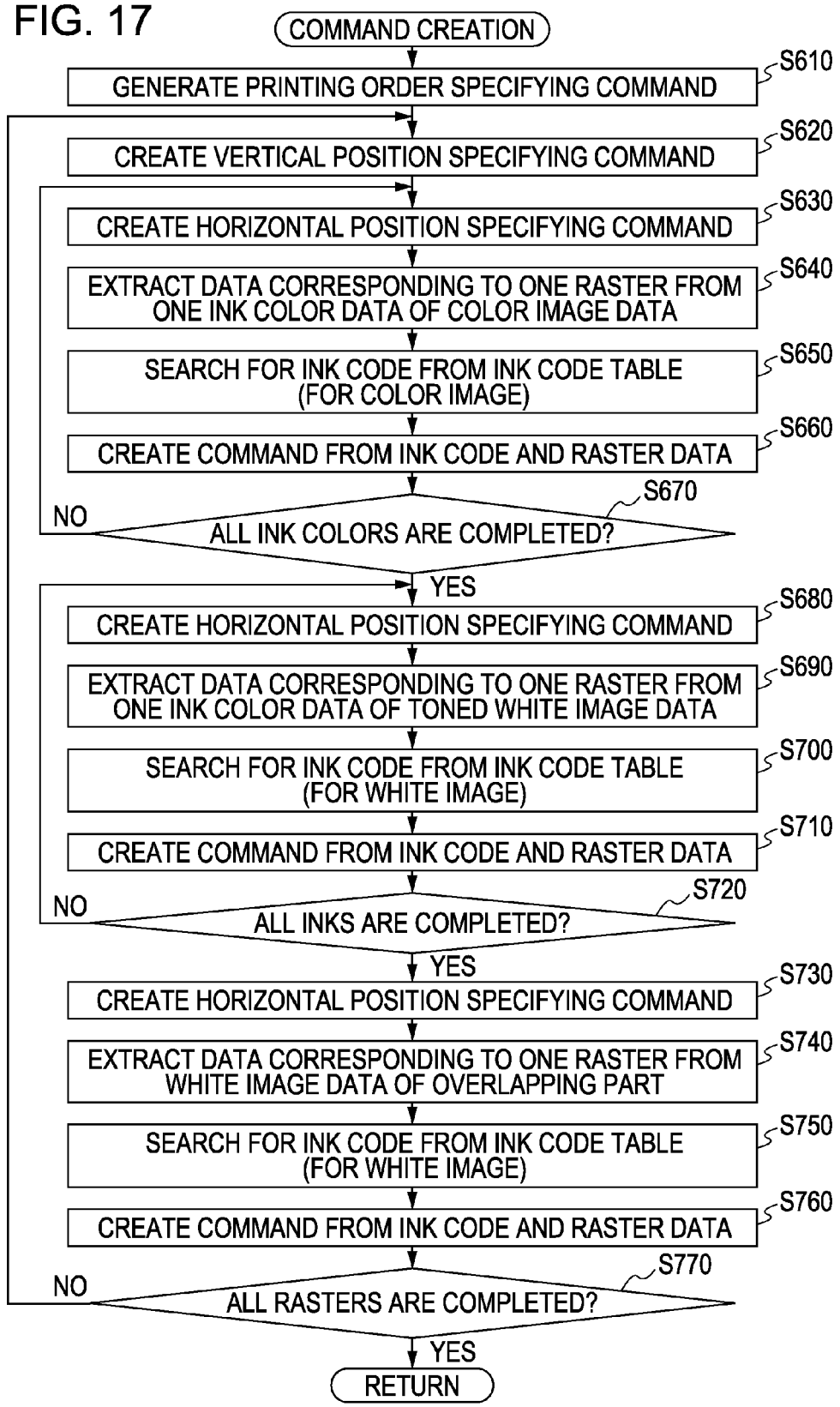
FIG. 17 is a flowchart illustrating the flow of a command creation process.
Figure 18A:
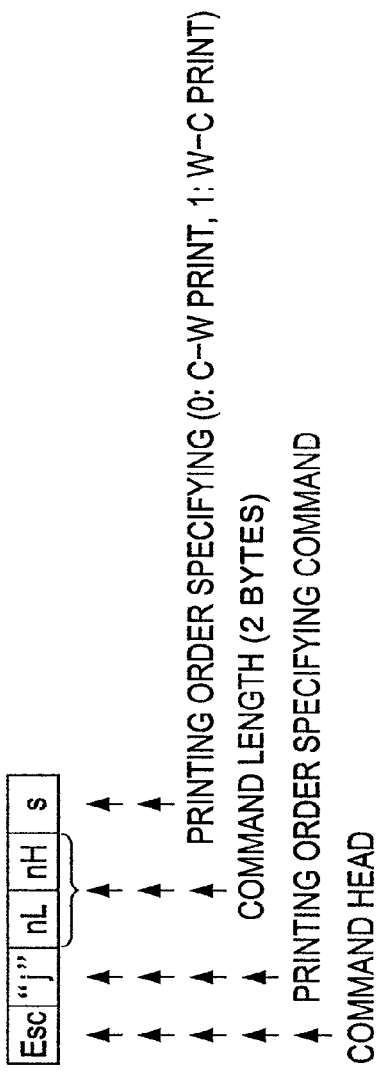
FIGS. 18A and 18B are diagrams illustrating one example of a command created by a command creation process.
Figure 18B:
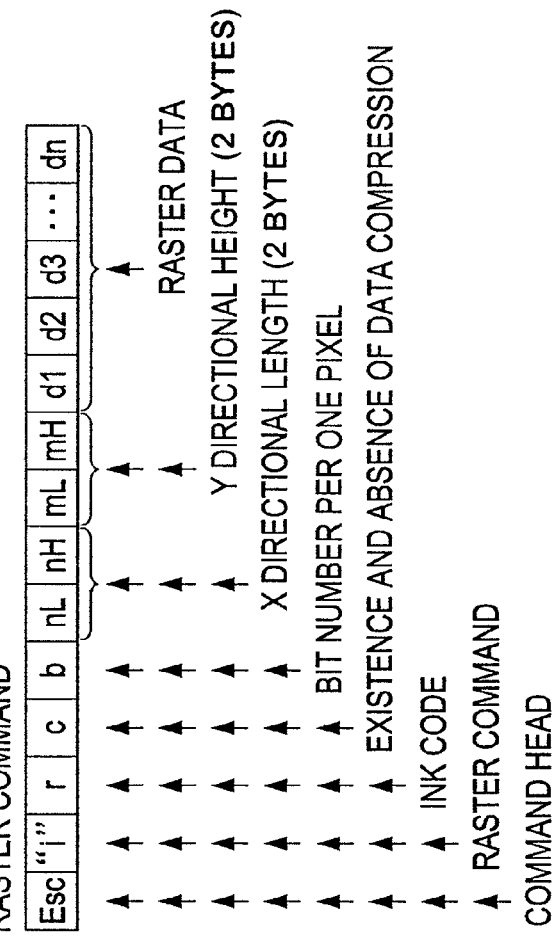

FIG. 17 is a flowchart illustrating the flow of the command creation process. In Step S610, the command creating module 370 (FIG. 4) creates a printing order specifying command based on the printing order specifying information SS output from the application program AP. FIGS. 18A and 18B are diagrams illustrating one example of a command created by the command creation process. FIG. 18A illustrates an example of the printing order specifying command. As illustrated in FIG. 18A, the printing order specifying command includes an identifier indicating a command head, an identifier indicating that the type of command is the printing order specifying command, a command length (2 byte) and printing order specifying. According to the printing order specifying, for example, a value "0" indicates the C-W print (the color image Ic is first formed and the white image Iw is formed on the color image Ic) and a value "1" indicates the W-C print (the white image Iw is first formed and the color image Ic is formed on the white image Iw). The command creating module 370 specifies the printing order with reference to the printing order specifying information SS to create the printing order specifying command for selecting the specified printing order.

In Step S620 (FIG. 17), the command creating module 370 (FIG. 4) creates a vertical position specifying command based on the dot data for the color image received from the halftone processing module 320 for the color image, the dot data for the toned white image received from the halftone processing module 360 for the toned white image, and the white image data WIOdata of the overlapping part. The vertical position specifying command is used for specifying the start position of an image along the vertical direction (Y direction), and is created as a common command for every ink.

Then, the command creating module 370 (FIG. 4) creates a raster command corresponding to the color image through Steps S630, S640, S650, S660 and S670 of FIG. 17. In Step S630, the command creating module 370 creates a horizontal position specifying command for one selected ink color based on the dot data for the color image. The horizontal position specifying command is used for specifying the start position of an image along the horizontal direction (X direction) for one ink color when the color image is formed. The command creating module 370 sets an appropriate image start position and creates the horizontal position specifying command with reference to the dot data for the color image for one ink color.

In Step S640 (FIG. 17), the command creating module 370 (FIG. 4) extracts dot data corresponding to one raster with respect to one ink color selected from the dot data for the color image. In Step S650, the command creating module 370 searches for an ink code with reference to the ink code table ICT. FIG. 19 is a table illustrating one example of the content of the ink code table ICT. As illustrated in FIG. 19, according to the embodiment, unique ink abbreviations and ink codes are allocated to respective ink colors. In addition, according to the embodiment, two different types of ink abbreviations and ink codes for the color image and the white image are allocated to one ink color. That is, the ink abbreviation and the ink code uniquely correspond to the combination of each of the plural ink colors and each of the color image and the white image. For example, in the case of cyan, an ink abbreviation "C" and an ink code "01H" for the color image are allocated thereto, and an ink abbreviation "WC" and an ink code "81H" for the white image are allocated thereto. Similarly to this, in the case of white, an ink abbreviation "IW" and an ink code "40H" for the color image are allocated thereto, and an ink abbreviation "W" and an ink code "C0H" for the white image are allocated thereto. In Step S650, the command creating module 370 searches for the ink code for the color image of the ink code table ICT.

In Step S660 (FIG. 17), the command creating module 370 (FIG. 4) creates the raster command based on the extracted dot data corresponding to one raster and the searched ink code. FIG. 18B illustrates an example of the raster command. As illustrated in FIG. 18B, the raster command includes an identifier indicating a command head, an identifier indicating that the type of a command is the raster command, an ink code, an identifier indicating the existence and absence of data compression, a bit number per one pixel, a X directional length (2 byte), a Y directional length (2 byte) and raster data (dot data).

Steps S630, S640, S650 and S660 of FIG. 17 are repeated until the process for all ink colors used for forming the color image is completed. That is, when there are ink colors which are not yet processed (Step S670: No), after one ink color which is not yet processed is selected, steps S630, S640, S650 and S660 are performed for the selected ink color. If the process for all ink colors is completed (Step S670: Yes), the creation of the raster command corresponding to each of the ink colors used for forming the color image is completed with respect to one raster.

Then, the command creating module 370 (FIG. 4) creates a raster command corresponding to the white image (toned white image) of the non-overlapping white area Awn (FIG. 7) through Steps S680, S690, S700, S710 and S720 of FIG. 17. In Step S680, the command creating module 370 creates a horizontal position specifying command for one selected ink color based on the dot data for the toned white image. The horizontal position specifying command is used for specifying the start position of an image along the horizontal direction (X direction) for one ink color when the toned white image is formed. The command creating module 370 sets an appropriate image start position and creates the horizontal position specifying command with reference to the dot data for the toned white image for one ink color.

In Step S690 (FIG. 17), the command creating module 370 (FIG. 4) extracts dot data corresponding to one raster for one selected ink color from the dot data for the toned white image. In Step S700, the command creating module 370 searches for an ink code with reference to the ink code table ICT. The command creating module 370 searches for the ink code for the white image of the ink code table ICT (FIG. 19).

In Step S710 (FIG. 17), the command creating module 370 (FIG. 4) creates the raster command (refer to FIG. 18B) based on the extracted dot data corresponding to one raster and the searched ink code. Steps S680, S690, S700 and S710 of the command creation process are repeated until the process for all ink colors used for forming the toned white image is completed. That is, when there are ink colors which are not yet processed (Step S720: No), after one ink color which is not yet processed is selected, steps S680, S690, S700 and S710 are performed for the selected ink color. If the process for all ink colors is completed (Step S720: Yes), the creation of the raster command corresponding to each of the ink colors used for forming the toned white image is completed with respect to one raster.

Then, the command creating module 370 (FIG. 4) creates a raster command corresponding to the white image of the overlapping white area Awo (FIG. 7) through Steps S730, S740, S750 and S760 of FIG. 17. As described above, since the white image of the overlapping white area Awo is formed using only the white ink, the raster command corresponding to the overlapping white area Awo is created as only a command corresponding to the white ink.

In Step S730 (FIG. 17), the command creating module 370 creates a horizontal position specifying command based on the white image data WIOdata of the overlapping part. The horizontal position specifying command is used for specifying the start position of an image along the horizontal direction (X direction). The command creating module 370 sets an appropriate image start position and creates the horizontal position specifying command with reference to the white image data WIOdata of the overlapping part.

In Step S740 (FIG. 17), the command creating module 370 (FIG. 4) extracts dot data corresponding to one raster from the white image data WIOdata of the overlapping part. In Step S750, the command creating module 370 searches for an ink code of the white ink for the white image with reference to the ink code table ICT (FIG. 19). In Step S760, the command creating module 370 creates the raster command (refer to FIG. 18B) based on the extracted dot data corresponding to one raster and the searched ink code.

Steps S620, S630, S640, S650, S660, S670, S680, S690, S700, S710, S720, S730, S740, S750 and S760 of the command creation process (FIG. 17) are repeated until the process for the entire raster of the printed image PI is completed. That is, when there is a raster which is not yet processed (Step S770: No), after a raster (raster immediately before a raster processed in the previous time) which is not yet processed is selected, steps S620, S630, S640, S650, S660, S670, S680, S690, S700, S710, S720, S730, S740, S750 and S760 are performed for the selected raster. If the process for the entire raster is completed (Step S770: Yes), the creation of the command corresponding to each of the ink colors used for forming the color image and the white image is completed with respect to the entire raster.

In Step S260 of the processing (FIG. 9) performed by the printer driver 300, the printer driver 300 transmits the printing order specifying command, the vertical position specifying command and the horizontal position specifying command, which are created in Step S250, to the printer 100. In this way, the processing performed by the printer driver 300 is completed.

Figure 20:
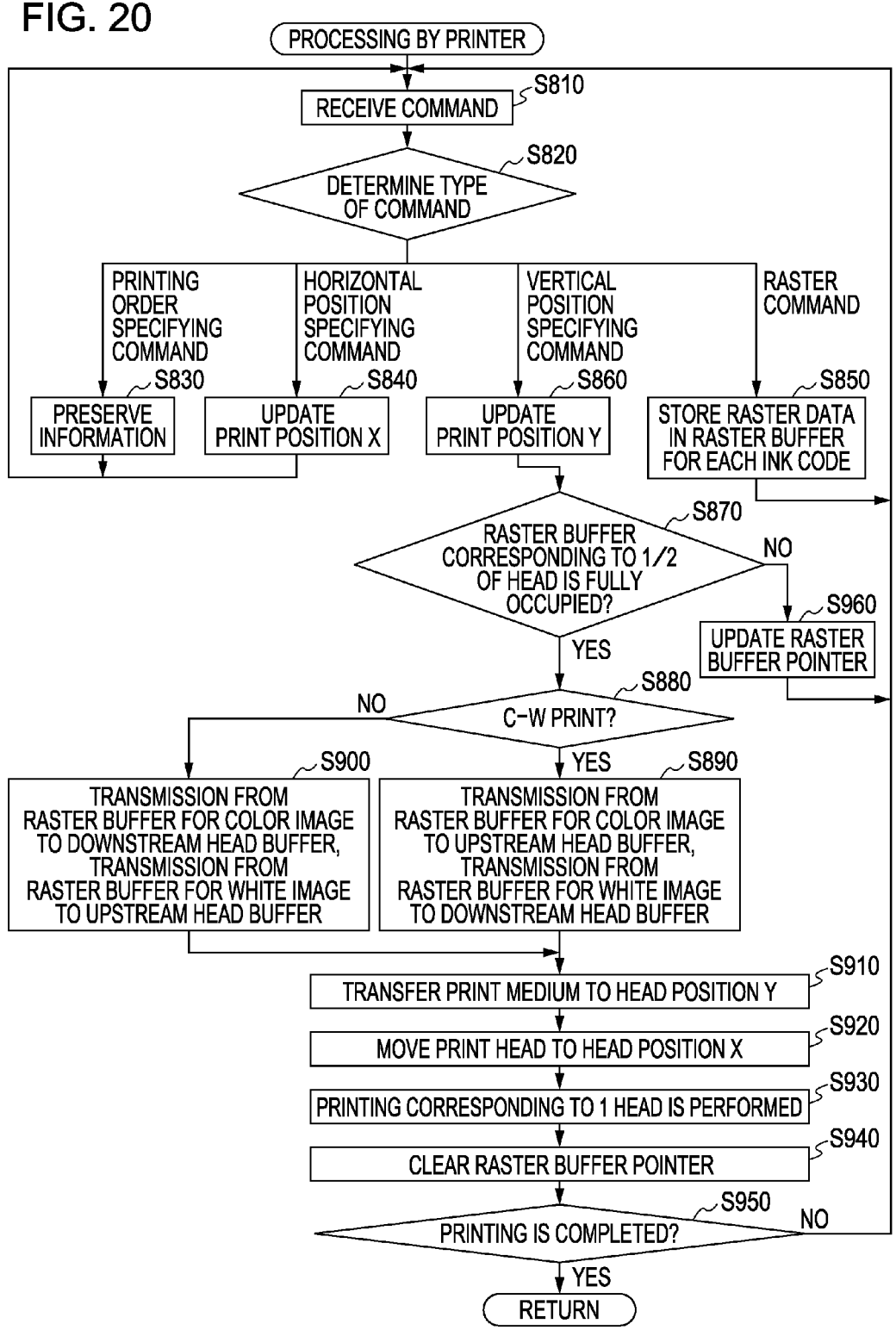
FIG. 20 is a flowchart illustrating the flow of a processing performed by a printer.

In Step S130 of the printing process (FIG. 6), the processing by the printer 100 is performed. FIG. 20 is a flowchart illustrating the flow of the processing performed by the printer 100. In Step S810, the CPU 110 (FIG. 3) executing the command processing module 112 (FIG. 5) of the printer 100 receives the commands transmitted from the printer driver 300 of the PC 200. The CPU 110 determines the type of received commands (Step S820) to perform a processing according to the type of commands. When the received command is the printing order specifying command, the CPU 110 preserves information representing a printing order specified by the printing order specifying command in the RAM 130 (Step S830). When the received command is the horizontal position specifying command, the CPU 110 updates the print start position X in the horizontal direction (Step S840).

Figure 21:
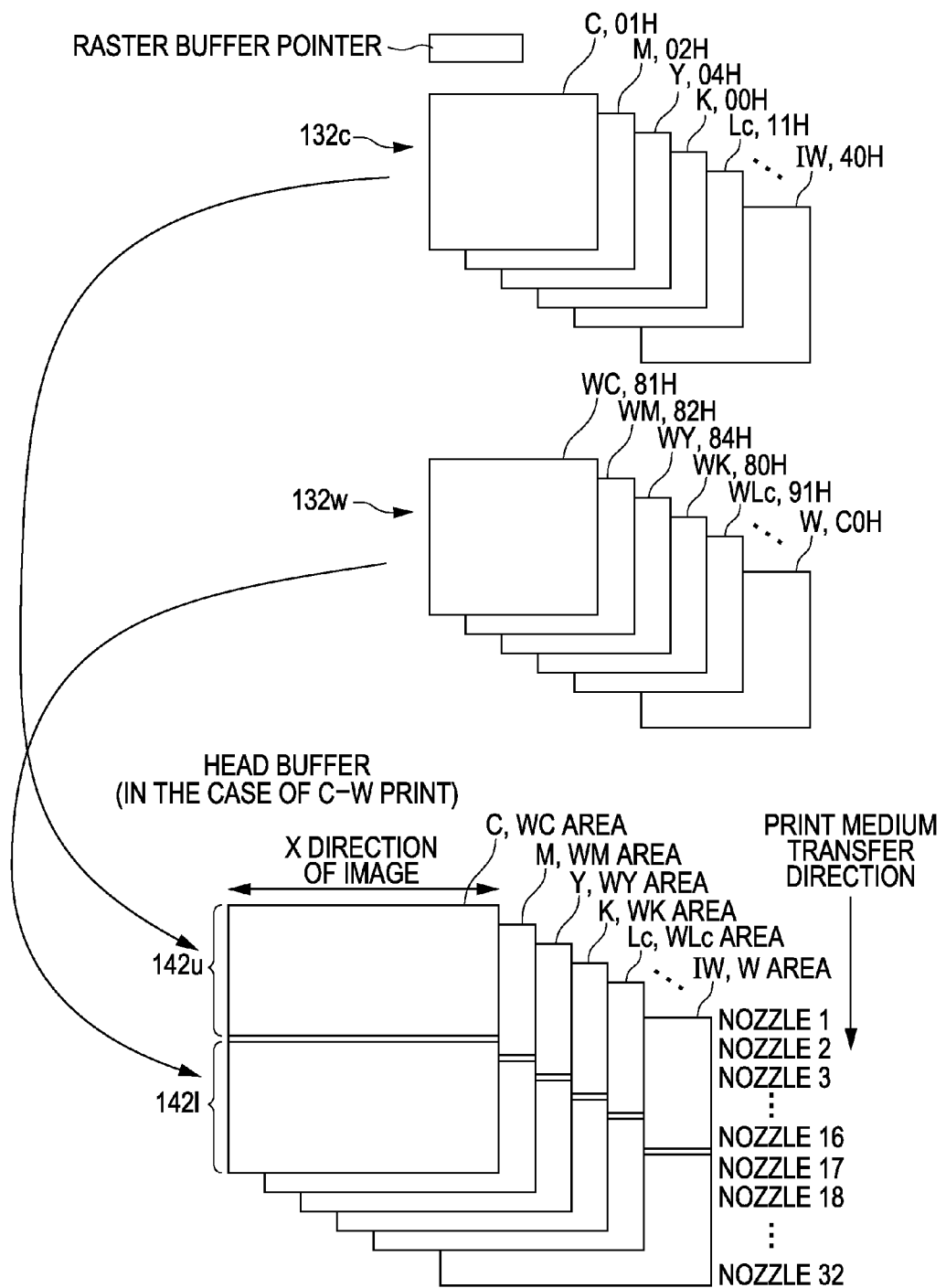
FIG. 21 is a diagram illustrating the detailed configuration of a raster buffer and a head buffer.

Further, when the received command is the raster command, the CPU 110 (FIG. 3) executing the command processing module 112 (FIG. 5) stores the raster data (dot data) included in the raster command in the raster buffer 132 (FIG. 5) according to ink codes (Step S850). FIG. 21 is a diagram illustrating the detailed configuration of the raster buffer and the head buffer. The raster buffer 132c for the color image is shown in the upper portion of FIG. 21 and the raster buffer 132w for the white image is shown in the middle portion thereof. As illustrated in FIG. 21, the raster buffer 132 includes areas according to the ink codes (refer to FIG. 19) allocated thereto. That is, the raster buffer 132c for the color image includes a set of areas corresponding to the respective ink codes for the color image, and the raster buffer 132w for the white image includes a set of areas corresponding to the respective ink codes for the white image. The size in the X direction of each area of the raster buffer 132 corresponds to an image size, and the size in the Y direction thereof is more than ½ of the height of the print head 144. The raster buffer 132 has a Y directional raster buffer pointer indicating the reception level of the raster data.

The head buffer 142 (FIG. 5) is shown in the lower portion of FIG. 21. As illustrated in FIG. 21, the head buffer 142 includes areas according to seven ink colors allocated thereto. That is, the head buffer 142 includes a set of an area for cyan (C, WC), an area for magenta (M, WM), an area for yellow (Y, WY), an area for black (K, WK), an area for light cyan (Lc, WLc), an area for light magenta (Lm, WLm) and an area for white (IW, W). The size in the X direction of each area of the head buffer 142 corresponds to the scanning distance of the carriage, and the size in the Y direction thereof corresponds to the number of nozzles constituting each nozzle array 146 of the print head 144. Further, each of the areas according to the ink colors of the head buffer 142 is divided into two areas 142u and 142l for upstream and downstream.

Figure 22A:
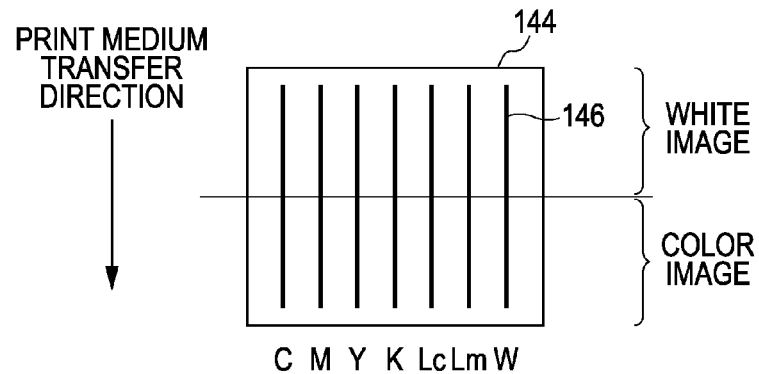
FIGS. 22A to 22C are diagrams illustrating the configuration of a print head of a printer.
Figure 22B:
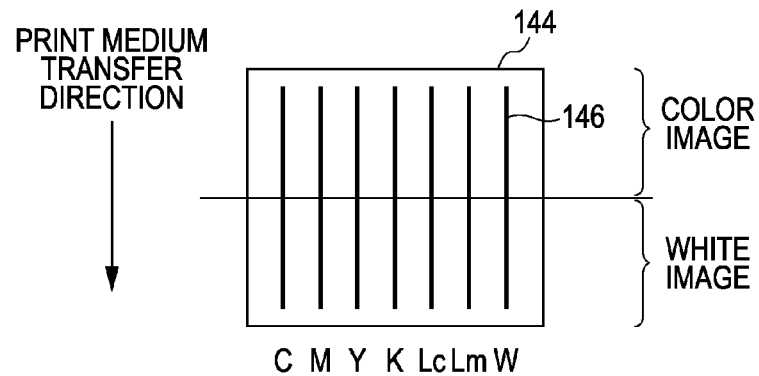
Figure 22C:
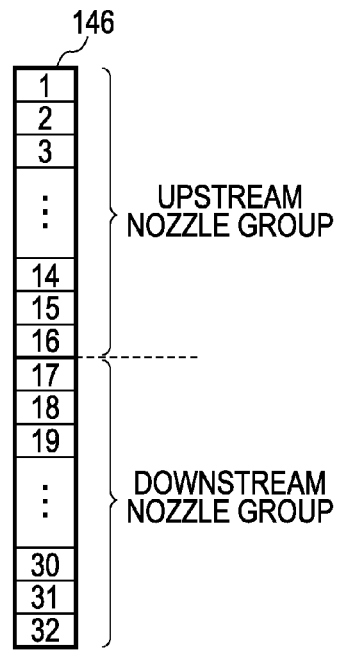

FIGS. 22A to 22C are diagrams illustrating the configuration of the print head 144 of the printer 100. As illustrated in FIGS. 22A and 22B, the print head 144 is provided with the nozzle array 146 corresponding to each of the seven ink colors. The nozzle arrays 146 are formed to extend in the Y direction (print medium feeding direction). Further, as illustrated in FIG. 22C, each nozzle array 146 includes 32 nozzle groups arranged in a row in the print medium feeding direction. Hereinafter, nozzle groups (from a first nozzle (nozzle 1) to a 16th nozzle (nozzle 16)) located at an upper half of the nozzle groups constituting each nozzle array 146 in the print medium feeding direction will be referred to as an upstream nozzle group, and nozzle groups (from a 17th nozzle (nozzle 17) to a 32th nozzle (nozzle 32)) located at a lower half of the nozzle groups constituting each nozzle array 146 in the print medium feeding direction will be referred to as a downstream nozzle group.

As illustrated in FIG. 22A, in the case of the W-C print, the white image is formed using the upstream nozzle group of each nozzle array 146 of the print head 144 and the color image is formed using the downstream nozzle group thereof. Further, as illustrated in FIG. 22B, in the case of the C-W print, the color image is formed using the upstream nozzle group of each nozzle array 146 of the print head 144 and the white image is formed using the downstream nozzle group thereof. In addition, in the case of the W-C print, the upstream nozzle group of each nozzle array 146 of the print head 144 corresponds to a second nozzle group of the invention and the downstream nozzle group corresponds to a first nozzle group thereof. In contrast, in the case of the C-W print, the upstream nozzle group of each nozzle array 146 of the print head 144 corresponds to the first nozzle group of the invention and the downstream nozzle group corresponds to the second nozzle group thereof.

As illustrated in FIG. 21, the upstream head buffer 142u is a half of the head buffer 142 corresponding to an upstream part (upstream nozzle group) in the print medium feeding direction of the print head 144, and the downstream head buffer 142l is a remaining half of the head buffer 142 corresponding to a downstream part (downstream nozzle group) in the print medium feeding direction of the print head 144.

In Step S850 of FIG. 20, the CPU 110 (FIG. 3) stores the raster data in the position specified by the rater buffer pointer of the raster buffer 132 corresponding to the ink code with reference to the ink code included in the received raster data. Consequently, the CPU 110 appropriately can distribute the raster data to the raster buffer 132 regardless of whether the raster command corresponds to the color image or the white image.

When the received command is the vertical position specifying command, the CPU 110 (FIG. 3) executing the command processing module 112 (FIG. 5) updates the print start position Y in the vertical direction (Step S860). Next, the CPU 110 determines whether the raster buffer 132 corresponding to ½ of the height of the print head 144 (FIG. 5) is fully occupied (i.e., the raster data is stored) (Step S870). When the raster buffer 132 is not fully occupied (Step S870: No), the CPU 110 updates the raster buffer pointer of the raster buffer 132 (Step S960).

If the above-described process is repeated and the raster data is stored in the raster buffer 132 corresponding to ½ of the height of the print head 144, the CPU 110 determines that the raster buffer 132 corresponding to ½ of the height of the print head 144 is fully occupied (Step S870: Yes). At this time, the CPU 110 (FIG. 3) determines whether the printing order indicates the C-W print or the W-C print based on the information representing the printing order preserved in the RAM 130 (Step S880). When the printing order indicates the C-W print (Step S880: Yes), the CPU 110 transmits the raster data from the raster buffer 132c for the color image to the upstream head buffer 142u (FIG. 5), and transmits the raster data from the raster buffer 132w for the white image to the downstream head buffer 142l (FIG. 5) (Step S890). FIG. 21 illustrates the state in which in the case of the C-W print, the raster data is transmitted from the raster buffer 132c for the color image to the upstream head buffer 142u, and the raster data is transmitted from the raster buffer 132w for the white image to the downstream head buffer 142l. In this way, the C-W print (FIG. 22B) is prepared in which the color image is formed using the upstream nozzle group of each nozzle array 146 of the print head 144 and the white image is formed using the downstream nozzle group thereof.

Meanwhile, when the printing order indicates the W-C print (Step S880: No), the CPU 110 transmits the raster data from the raster buffer 132c for the color image to the downstream head buffer 142l (FIG. 5), and transmits the raster data from the raster buffer 132w for the white image to the upstream head buffer 142u (Step S900). In this way, the W-C print (FIG. 22A) is prepared in which the white image is formed using the upstream nozzle group of each nozzle array 146 of the print head 144 and the color image is formed using the downstream nozzle group thereof.

Then, the CPU 110 (FIG. 3) controls the print medium feeding controller 160 and the print medium feeding motor 162 to transfer the print medium PM to the head position Y (sub-scanning) (Step S910), and controls the CR controller 150 and the CR motor 152 to move the print head 144 to the print start position X (Step S920). In addition, the CPU 110 performs main scanning to perform printing corresponding to the height of the print head 144 (Step S930). At this time, in the case of the W-C print (refer to FIG. 22A), the formation of the white image using the upstream nozzle group (refer to FIG. 22C) of each nozzle array 146 of the print head 144 is accomplished together with the formation of the color image using the downstream nozzle group thereof. Further, in the case of the C-W print (refer to FIG. 22B), the formation of the color image using the upstream nozzle group of each nozzle array 146 of the print head 144 is accomplished together with the formation of the white image using the downstream nozzle group thereof.

Next, the CPU 110 (FIG. 3) clears the raster buffer point of the raster buffer 132 (Step S940), determines whether the printing process for the whole of the print image PI has been completed (Step S950), and repeats Steps S810, S820, S830, S840, S850, S860, S870, S880, S890, S900, S910, S920, S930 and S940 until it is determined that the printing process has been completed. Then, if it is determined that the printing process has been completed, the printing process (FIG. 6) ends.

As described above, according to the printing system 10 of the embodiment, it is possible to perform the printing process of forming the color image and the white image on the print medium PM by using the inks of plural colors including the white color. When the printing process of the printing system 10 is performed, each of the seven nozzle arrays 146 corresponding to the seven ink colors provided in the print head 144 of the printer 100 is divided into the upstream nozzle group and the downstream nozzle group (refer to FIG. 22C). Further, in the case of the W-C print (refer to FIG. 22A), the ink is ejected from the upstream nozzle group to form the white image while in the case of the C-W print (refer to FIG. 22B), the ink is ejected from the downstream nozzle group to form the white image. Herein, according to the embodiment, after a part, which does not overlap the color image Ic except for the character image in the white area corresponding to the white image, is set as the non-overlapping white area Awn, and the toned white image is formed in an area on the print medium PM corresponding to the non-overlapping white area Awn by using the ink of the white color and at least one color other than the white color. Consequently, according to the embodiment, when performing the printing by using the inks of plural colors including the white color, the white image (toned white image) can be formed with a desired color in an observable area on the print medium together with the color image. In addition, according to the embodiment, after a part, which overlaps the color image Ic except for the character image in the white area corresponding to the white image, is set as the overlapping white area Awo, and the white image is formed in an area on the print medium PM corresponding to the overlapping white area Awo by using only the white ink. Consequently, according to the embodiment, the influence exerted on the color of the color image due to the formation of the white image can be prevented.

Figure 23A:
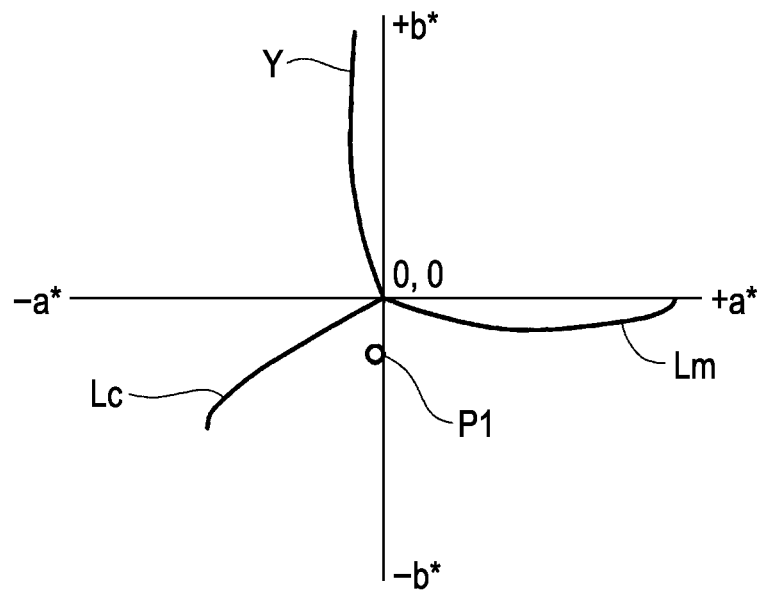
FIGS. 23A and 23B are diagrams illustrating the concept of white toning for adjusting a white color.
Figure 23B:
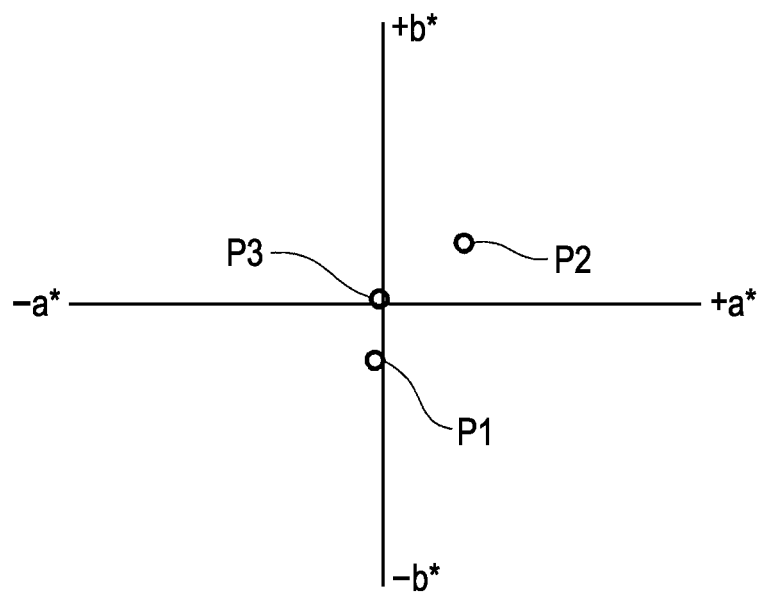

FIGS. 23A and 23B are diagrams illustrating the concept of the white toning for adjusting a white color. FIG. 23A illustrates one example of the position P1 of the color of the white ink of the printer 100 on the a*–b* plane, and FIG. 23B further illustrates one example of the position P2 of a target white color and the position P3 of a color obtained by mixing a predetermined amount of yellow ink with the white ink of the printer 100. As illustrated in FIG. 23B, for example, the yellow ink is mixed with the white ink of the printer 100, so that the color of the white image can approach the target white color. In addition, for example, a predetermined amount of light magenta ink is further mixed therewith, so that the color of the white image can further approach the target white color. As described above, when forming the white image, both the white ink and the ink of at least one color other than the white color are used, so that the white image can be formed with a desired color.

Figure 24A:
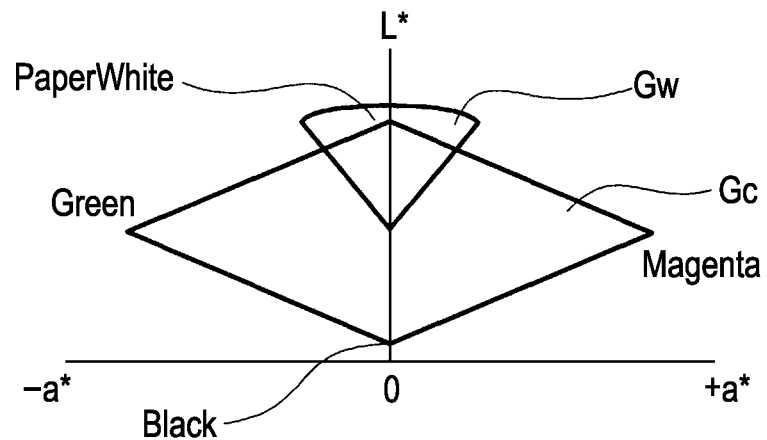
FIGS. 24A and 24B are diagrams illustrating one example of a color reproduction range (gamut) of a color image and a white image.
Figure 24B:
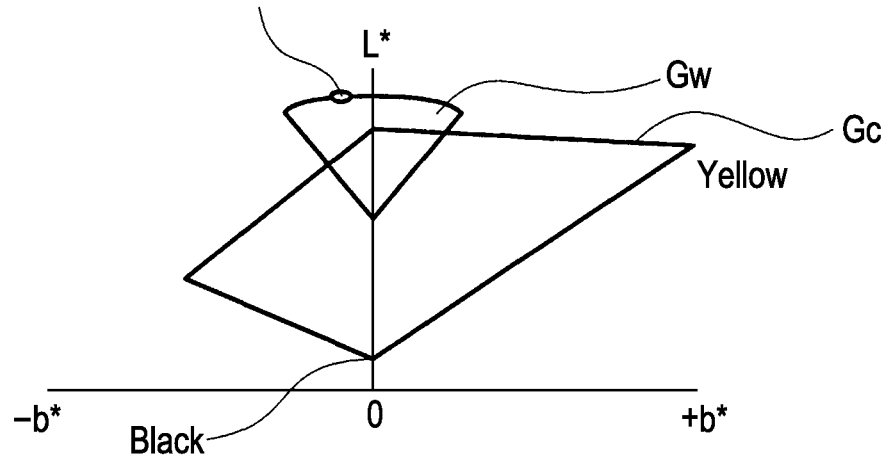

FIGS. 24A and 24B are diagrams illustrating one example of the color reproduction range (gamut) of the color image and the white image. FIG. 24A illustrates the gamut Gc of the color image and the gamut Gw of the toned white image when viewed from the direction of –b*, and FIG. 24B illustrates the gamut Gc of the color image and the gamut Gw of the toned white image when viewed from the direction of +a*. As described above, according to the embodiment, one (first image forming unit) of the upstream nozzle group and the downstream nozzle group of the nozzle array 146 of the print head 144 is used to form the color image (first image). Herein, when forming the color image, six inks (first ink group) of the seven colored inks, except for the white color, are used and the white ink is not used. Meanwhile, the other one (second image forming unit) of the upstream nozzle group and the downstream nozzle group of the nozzle array 146 of the print head 144 is used to form the white image (second image). Further, when forming the toned white image in the white image, five inks (second ink group) of the seven colored inks, including white, yellow, black, light cyan and light magenta, are used and the two-colored inks including cyan and magenta are not used. The difference between the color reproduction range of the first ink group and the color reproduction range of the second ink group, resulting in the difference between the gamut Gc (first color reproduction range) of the color image and the gamut Gw (second color reproduction range) of the toned white image. According to the printing process of the printing system 10 performed in the embodiment, two images (color image and toned white image) having different color reproduction ranges can be formed on the print medium PM, and various printed matters including a plurality of images having different color reproduction ranges can be easily produced. In addition, according to the printing process of the printing system 10 performed in the embodiment, the formation of the color image is accomplished together with the formation of the toned white image in at least a part of a period during the printing, so that various printed matters including a plurality of images having different color reproduction ranges can be produced efficiently and easily.

Furthermore, according to the printing process of the printing system 10 performed in the embodiment, in both the W-C print and the C-W print, in the same main scanning (same path), the formation of the white image using one of the upstream nozzle group and the downstream nozzle group can be accomplished together with the formation of the color image using the other one of the upstream nozzle group and the downstream nozzle group. Consequently, the color image and the white image can be formed on the print medium through a one-time printing process and the toned white image can be formed with a desired color, without using the process of forming the whole of one of the white image and the color image on the print medium and then forming the whole of the other one of them on the print medium.

Moreover, according to the printing process of the printing system 10 performed in the embodiment, in the case in which the printing order indicating that the color image is first formed is specified by the printing order specifying command (FIG. 18A) for specifying the printing order received in the printer 100 from the PC 200, the upstream nozzle group is set as a nozzle group for forming the color image and the downstream nozzle group is set as a nozzle group for forming the white image. Meanwhile, in the case in which the printing order indicating that the white image is first formed is specified, the upstream nozzle group is set as a nozzle group for forming the white image and the downstream nozzle group is set as a nozzle group for forming the color image. Consequently, according to the printing process of the printing system 10 performed in the embodiment, the toned white image can be formed with a desired color in both the W-C print and the C-W print, and it is possible to satisfy the purposes of the printed matter (refer to FIG. 8).

Further, in the printing system 10 of the embodiment, the ink codes included in the raster command (FIG. 18B) as the print command are set to correspond uniquely to the combination of the respective seven-colored inks and the respective color and white images. Consequently, regardless of whether the raster command corresponds to the color image or the white image, the CPU 110 of the printer 100 can control the nozzle group (upstream nozzle group or downstream nozzle group) for forming the color image based on the raster command including the ink codes corresponding to the color image, and control the nozzle group (downstream nozzle group or upstream nozzle group) for forming the white image based on the raster command including the ink codes corresponding to the white image.

Furthermore, in the printing system 10 of the embodiment, the raster buffer 132 of the printer 100 includes the area 132c for the color image and the area 132w for the white image (refer to FIG. 5). Consequently, the CPU 110 of the printer 100 allows the raster buffer 132 to store the raster data, which is included in the raster command including the ink codes corresponding to the color image, in the area 132c for the color image, and to store the raster data, which is included in the raster command including the ink codes corresponding to the white image, in the area 132w for the white image, thereby controlling the nozzle group for forming the color image and the nozzle group for forming the white image.

Moreover, according to the printing process of the printing system 10 performed in the embodiment, when forming the toned white image, four inks of the six-colored inks except for the white color, including yellow (Y), black (K), light cyan (Lc) and light magenta (Lm), are used while the two-colored inks including cyan (C) and magenta (M) are not used. That is, when forming the toned white image, the dark-colored ink of the two types of inks including the light-colored ink and the dark-colored ink is not used with respect to the same color tone. Consequently, according to the printing process of the embodiment, the toned white image can be formed with a desired color and the quality of the toned white image can be prevented from being degraded (increase of graininess). Further, according to the printing process of the embodiment, the black (K) ink is used for forming the toned white image, so that the brightness of the toned white image can be adjusted and the color of the toned white image can be selected in a wide range.

In addition, according to the printing process of the printing system 10 performed in the embodiment, the toned white color (color of the toned white image) can be specified on the UI window W1 (FIG. 11) for specifying the toned white color, so that the color of the toned white image when printing the color image and the white image by using the inks of plural colors including the white color can be specified accurately and easily. Particularly, according to the printing system 10 of the embodiment, the color (Lab value and T value) based on the color measurement result obtained by the colorimeter CM can be specified, so that the color of the toned white image can be specified more accurately and easily. Moreover, according to the printing system 10 of the embodiment, the toned white color can be specified by the Lab value and the T value, so that the value of a color including the concentration of the toned white image can be accurately specified. In addition, according to the printing system 10 of the embodiment, the specified color is displayed on the sample image display area Sa of the UI window W1 for specifying the toned white color, so that a user can easily specify colors while confirming the displayed color.

B. Second Embodiment

According to the first embodiment, the color of the non-overlapping white area Awn (refer to FIG. 7A) of the printed image PI is set as the first color specified by the toned white specifying processing (Step S220 of FIG. 9), and the toned white image is formed as an image of the first color. Compared to this, according to the second embodiment, the color of the non-overlapping white area Awn is allowed to be changed according to sub-areas thereof. That is, according to the second embodiment, in the toned white specifying processing, the non-overlapping white area Awn of the printed image PI is divided into a plurality of sub-areas and different colors (Lab value and T value) can be specified in the sub-areas.

Figure 25:
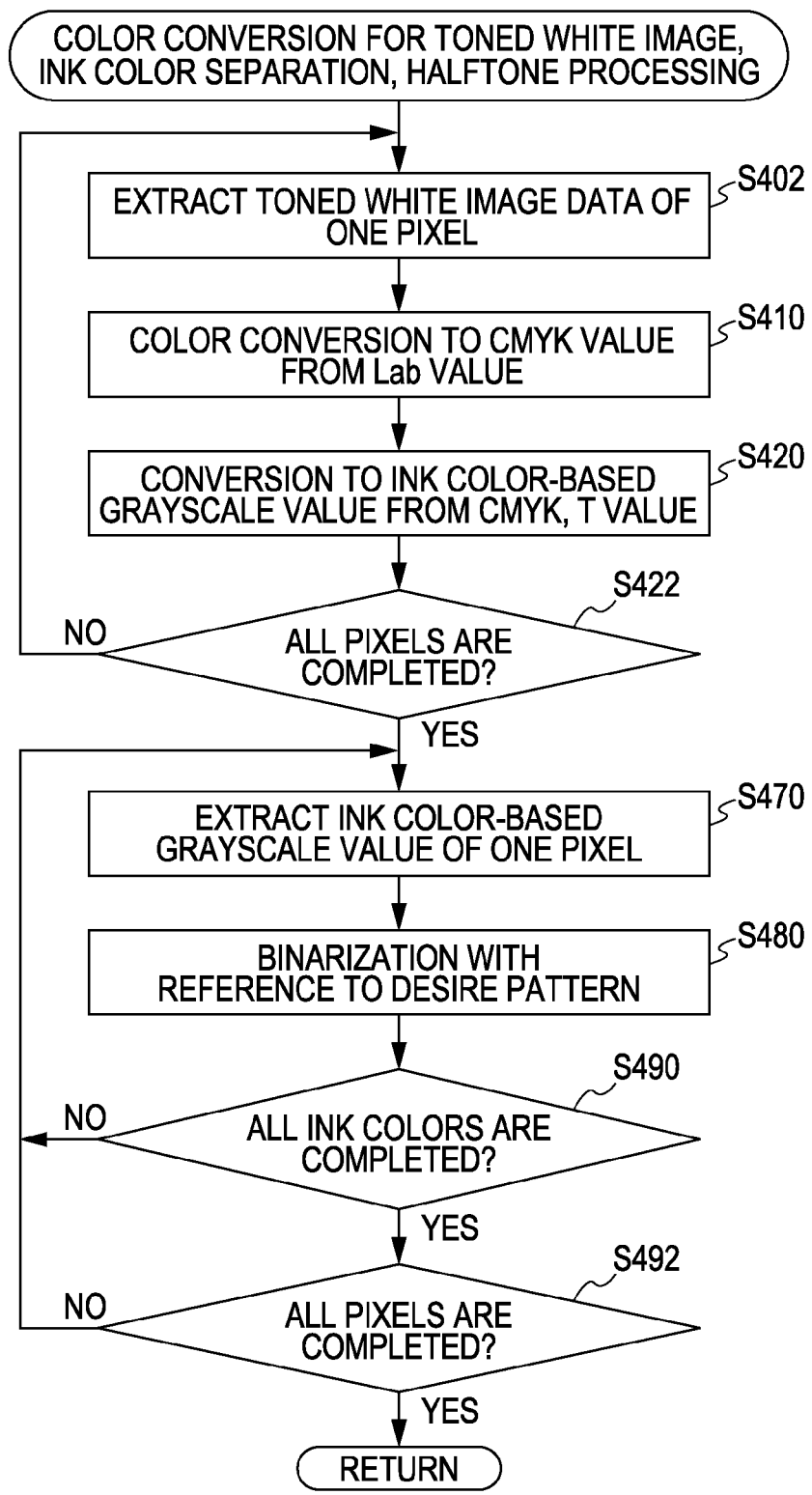
FIG. 25 is a flowchart illustrating the flow of a color conversion processing for a toned white image, an ink color separation processing and a halftone processing according to a second embodiment.

FIG. 25 is a flowchart illustrating the flow of a color conversion processing for a toned white image, an ink color separation processing and a halftone processing according to the second embodiment. In FIG. 25, the same step numbers are used to designate the same contents as that of the first embodiment illustrated in FIG. 13. According to the first embodiment, since the colors (Lab value and T value) of all pixels corresponding to the non-overlapping white area Awn of the toned white image data are equal to each other, the color conversion (Step S410 of FIG. 13) to the CMYK value from the Lab value and/or the conversion (Step S420 of FIG. 13) to the ink color-based grayscale value from the CMYK, T value are commonly performed with respect to all pixels. Compared to this, according to the second embodiment, since the colors of pixels corresponding to the non-overlapping white area Awn of the toned white image data are different according to the pixels, after one pixel of the toned white image data is extracted (Step S402 of FIG. 25), the color conversion (Step S410 of FIG. 25) to the CMYK value from the Lab value and the conversion (Step S420 of FIG. 25) to the ink color-based grayscale value from the CMYK, T value are performed for each extracted pixel. The above processes are performed with respect to all pixels (refer to Step S422 of FIG. 25). The processing (halftone processing) after Step S422 of FIG. 25 is the same as that of the first embodiment illustrated in FIG. 13.

As described above, even in the second embodiment, the color image and the white image can be formed on the print medium PM and the toned white image in the white image can be formed with a desired color. In addition, according to the second embodiment, a plurality of types of toned white images with different colors can be formed on the print medium PM, resulting in the production of various printed matters.

C. Third Embodiment

Figure 26:
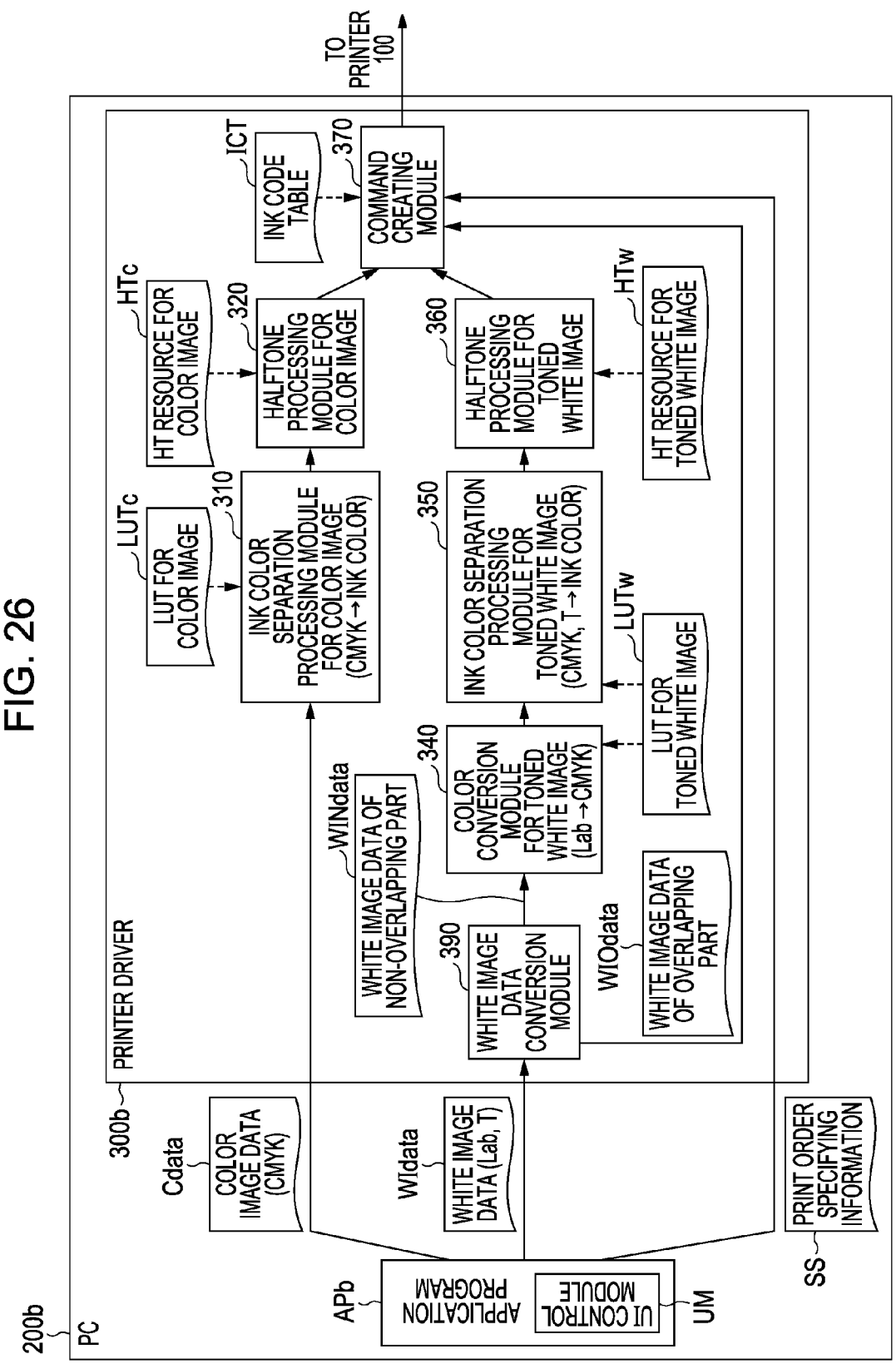
FIG. 26 is a block diagram functionally illustrating the configuration of a PC according to a third embodiment.

FIG. 26 is a block diagram functionally illustrating the configuration of a PC 200b according to the third embodiment. The PC 200b according to the third embodiment is substantially identical to the PC 200 according to the first embodiment illustrated in FIG. 4, except that an application program APb includes a UI control module UM and a printer driver 300b includes a white image data conversion module 390 instead of the toned white specifying module 330. According to the third embodiment, the toned white specifying processing (Steps S220 of FIG. 9) is performed by the application program APb instead of the printer driver 300b. The content of the toned white specifying processing according to the third embodiment is equal to that of the toned white specifying processing according to the first embodiment.

The printing process of the third embodiment is equal to that of the first embodiment illustrated in FIG. 6. According to the printing process of the third embodiment, after the toned white specifying processing is performed by the application program APb, if a printing execution instruction is received from a user (Steps S110 of FIG. 6), the color image data Cdata, the white image data WIdata and the printing order specifying information SS are output to the printer driver 300b, so the processing (Step S120) by the printer driver 300b is started.

Figure 27:
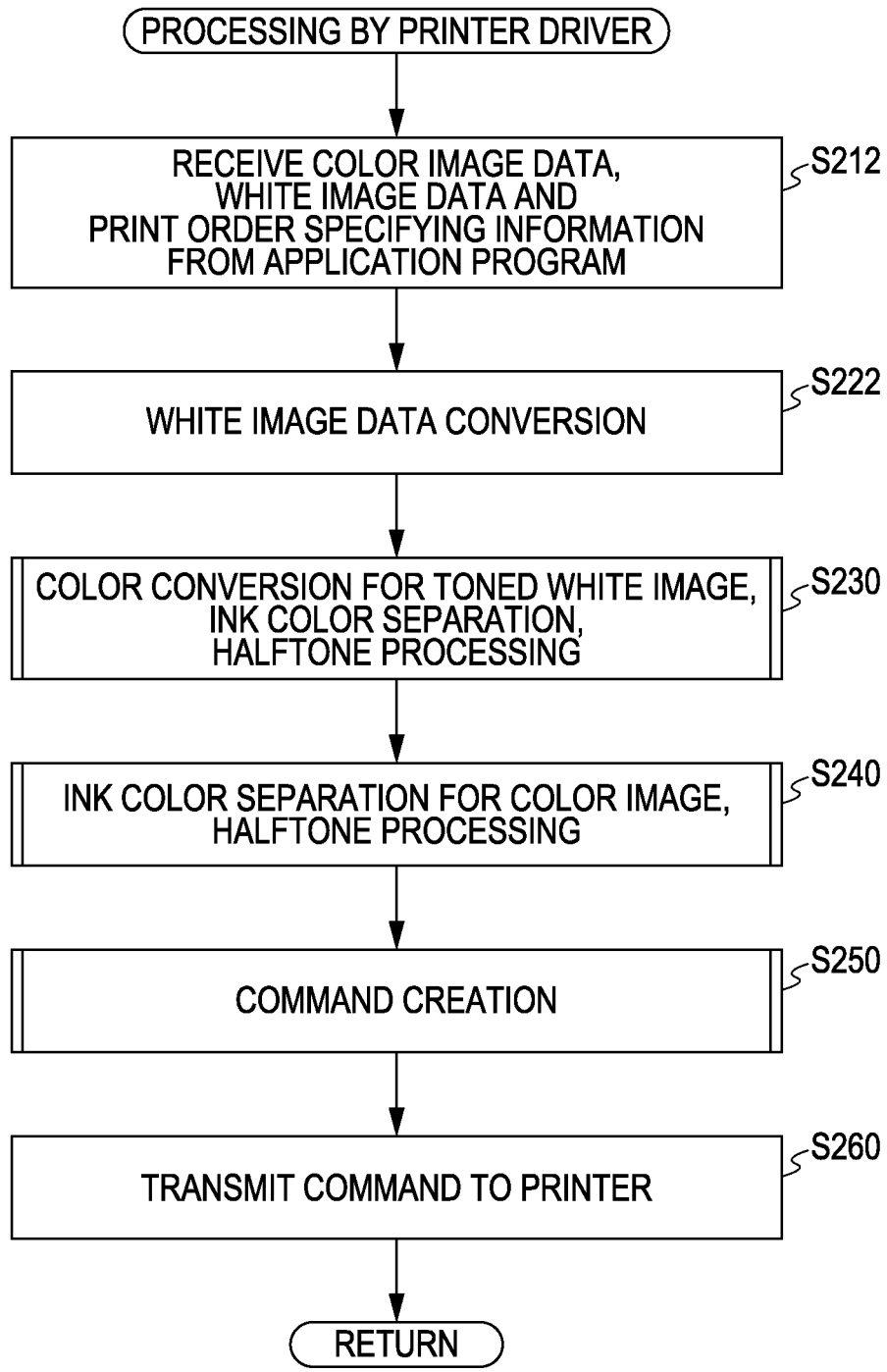
FIG. 27 is a flowchart illustrating the flow of a processing performed by a CPU executing a printer driver according to a third embodiment.

FIG. 27 is a flowchart illustrating the flow of the processing performed by the CPU 210 executing the printer driver 300b according to the third embodiment. In Step S212, the CPU 210 receives the color image data Cdata, the white image data WIdata and the printing order specifying information SS, which are output from the application program APb (refer to FIG. 26). The contents of the color image data Cdata and the printing order specifying information SS are equal to that of the first embodiment.

The white image data WIdata is used for specifying the white area (obtained by adding the non-overlapping white area Awn to the overlapping white area Awo) on the printed image PI (refer to FIG. 7A), and specifying the toned white color specified by the toned white specifying processing. In detail, in relation to the white image data WIdata, the value of pixels corresponding to the white area of the printed image PI is a value (e.g., W=255) representing that the white image is formed, and the value of remaining pixels is a value (e.g., W=0) representing that the white image is not formed. Further, the white image data WIdata may be expressed by a 2-bit value with respect to each pixel. In addition, the white image data WIdata represents the Lab value and the T value for specifying the toned white color.

In Step S222 (FIG. 27), the white image data conversion module 390 (FIG. 26) performs a white image data conversion processing by using the color image data Cdata and the white image data WIdata. According to the white image data conversion processing, the white image data WINdata of the non-overlapping part and the white image data WIOdata of the overlapping part are generated from the white image data WIdata. The contents of the white image data WINdata of the non-overlapping part and the white image data WIOdata of the overlapping part are equal to that of the first embodiment. That is, in relation to the white image data WINdata of the non-overlapping part, the value of pixels corresponding to the non-overlapping white area Awn of the printed image PI is a value (e.g., W=255) representing that the white image is formed, and the value of remaining pixels is a value (e.g., W=0) representing that the white image is not formed. However, according to the third embodiment, since the toned white specifying processing has been already performed, the white image data WINdata of the non-overlapping part includes data representing the Lab value and the T value for specifying the toned white color. Further, in relation to the white image data WIOdata of the overlapping part, the value of pixels corresponding to the overlapping white area Awo of the printed image PI is a value (e.g., W=255) representing that the white image is formed, and the value of remaining pixels is a value (e.g., W=0) representing that the white image is not formed.

According to the white image data conversion processing, the white image data conversion module 390 (FIG. 26) specifies the non-overlapping white area Awn and the overlapping white area Awo on the printed image PI based on the color image data Cdata and the white image data WIdata. In detail, after the white image data conversion module 390 determines overlapping of the white area specified by the white image data WIdata and the color image Ic specified by the color image data Cdata, the white image data conversion module 390 specifies a part, which does not overlap the color image Ic (in more detail, excluding the character image) in the white area, as the non-overlapping white area Awn while specifying a part, which overlaps the color image Ic (in more detail, excluding the character image) in the white area, as the overlapping white area Awo. Further, the white image data conversion module 390 extracts data of a part corresponding to the non-overlapping white area Awn from the white image data WIdata to set the data as the white image data WINdata of the non-overlapping part, while extracting data of a part corresponding to the overlapping white area Awo to set the data as the white image data WIOdata of the overlapping part. In addition, in the present embodiment, the color image data Cdata includes information for specifying the character image in the color image, and the white image data conversion module 390 specifies the non-overlapping white area Awn and the overlapping white area Awo by using the information.

The white image data WINdata of the non-overlapping part, which is generated in the white image data conversion processing (Step S222) of the processing (FIG. 27) performed by the printer driver 300b, is provided to the color conversion module 340 for the toned white image, and the white image data WIOdata of the overlapping part is provided to the command creating module 370 (refer to FIG. 26). Processing after Step S222 of the processing performed by the printer driver 300b and/or the printing process thereafter are the same as that of the first embodiment illustrated in FIGS. 6 and 9.

As described above, even in the third embodiment, when performing the printing by using the inks of plural colors including the white color, a white image (toned white image) can be formed with a desired color in an observable area on the print medium together with the color image, and the influence exerted on the color of the color image due to the formation of the white image can be prevented. Particularly, according to the third embodiment, the white image data conversion module 390 of the printer driver 300b can perform the white image data conversion processing of generating the white image data WINdata of the non-overlapping part and the white image data WIOdata of the overlapping part by using the color image data Cdata and the white image data WIdata. Consequently, according to the third embodiment, even in the case in which the color (toned white color) of the white area including the non-overlapping white area Awn to the overlapping white area Awo is specified without distinguishing the non-overlapping white area Awn from the overlapping white area Awo in the application program APb, the non-overlapping white area Awn and the overlapping white area Awo can be specified, the white image corresponding to the overlapping white area Awo can be formed using only a white ink, and the white image corresponding to the non-overlapping white area Awn can be formed using the white ink and an ink other than the white ink. Thus, a white image can be formed with a desired color in an observable area on the print medium together with the color image, and the influence exerted on the color of the color image due to the formation of the white image can be prevented.

D. Fourth Embodiment

FIG. 28A to 28D are diagrams illustrating one example of the printed image PI, the color image data Cdata, the white image data WINdata of the non-overlapping part, the white image data WIOdata of the overlapping part according to the fourth embodiment. Even in the fourth embodiment, similarly to the first embodiment, the color image data Cdata, the white image data WINdata of the non-overlapping part, the white image data WIOdata of the overlapping part, and the printing order specifying information SS are output from the application program AP to the printer driver 300 (refer to FIG. 4). According to the fourth embodiment, the printed image PI is substantially identical to the printed image PI of the first embodiment illustrated in FIG. 7, except that the printed image PI includes a barcode Co having a black portion Pb and a white portion Pw.

Figure 28A:
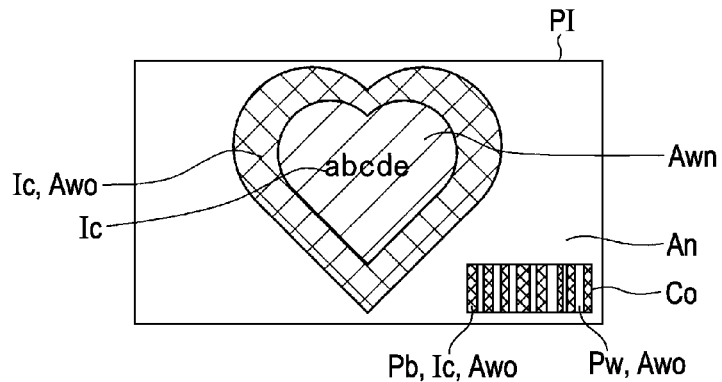
FIGS. 28A to 28D are diagrams illustrating one example of a printed image, color image data, white image data of a non-overlapping part, and white image data of an overlapping part according to a fourth embodiment.
Figure 28B:
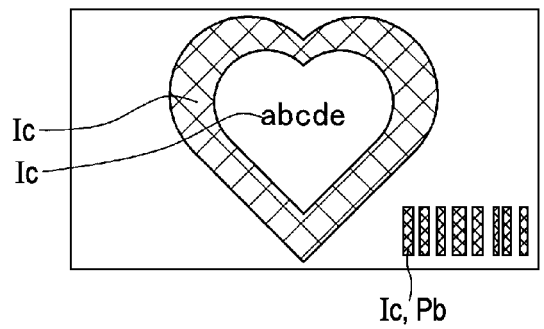
Figure 28C:
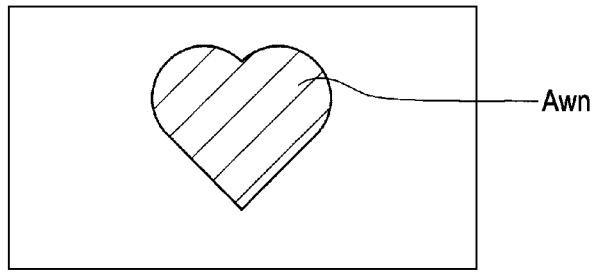
Figure 28D:
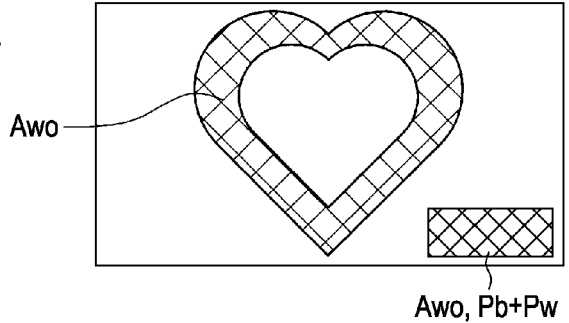

Since the black portion Pb of the barcode Co corresponds to the color image Ic, the color image data Cdata includes data for specifying the color (black) of pixels corresponding to the black portion Pb of the barcode Co as illustrated in FIG. 28B. Further, even in the fourth embodiment, since all areas in which the color image Ic is arranged is set as a white area, the black portion Pb of the barcode Co is set as the overlapping white area Awo. Consequently, in relation to the white image data WIOdata of the overlapping part, the value of pixels corresponding to the black portion Pb of the barcode Co represents that the white image is formed as illustrated in FIG. 28D.

Further, since the white portion Pw of the barcode Co does not overlap the color image Ic in the white area, the white portion Pw is set as the non-overlapping white area Awn under normal conditions. However, in the present embodiment, the white portion Pw is set as the overlapping white area Awo. Thus, in relation to the white image data WIOdata of the overlapping part, the value of pixels corresponding to the white portion Pw of the barcode Co represents that the white image is formed as illustrated in FIG. 28D. Meanwhile, in relation to the white image data WINdata of the non-overlapping part, the value of pixels corresponding to the white portion Pw of the barcode Co represents that the white image is not formed as illustrated in FIG. 28C.

Even in the fourth embodiment, the printing process equal to that of the first embodiment is performed. Thus, the white image corresponding to the white portion Pw of the barcode Co is formed as the white image corresponding to the overlapping white area Awo by using only the white ink. That is, the color of the white image corresponding to the white portion Pw of the barcode Co is not the toned white color but the color of the white ink.

As described above, even in the fourth embodiment, when performing the printing by using the inks of plural colors including the white color, a white image (toned white image) can be formed with a desired color in an observable area on the print medium together with the color image, and the influence exerted on the color of the color image due to the formation of the white image can be prevented. Further, according to the fourth embodiment, even in the case in which the part constituting the white portion Pw of the barcode Co in the white image does not overlap the color image Ic, since the color of the part is not the toned white color but the color of the white ink, the accuracy of reading of the barcode Co can be prevented from being reduced.

E. Modified Example

The invention is not limited to the previous embodiments. Various modified examples can be made within the scope of the appended claims. For example, the following modified examples can be made.

E1. Modified Example 1

The configuration of the printing system 10 according to the previous embodiments is just one example. That is, the printing system 10 may have various configurations. For example, in the previous embodiments, the printer 100 performs printing by using inks of seven colors including cyan, magenta, yellow, black, light cyan, light magenta and white. However, the printer 100 may perform printing by using inks of plural colors including a white color. For example, the printer 100 may perform printing by using inks of five colors including cyan, magenta, yellow, black and white.

Further, in the previous embodiments, when forming the color image, inks of six colors except for the white color are used, and the white ink is not used. However, the ink color used when forming the color image can be arbitrarily set according to an ink color available for the printer 100. For example, when forming the color image, the white ink may be used.

Further, in the previous embodiments, when forming the toned white image, inks of five colors including white, yellow, black, light cyan and light magenta are used, and inks of two colors including cyan and magenta are not used. However, the ink color used when forming the toned white image may include the white color and at least one color other than the white color, and can be arbitrarily set according to an ink color available for the printer 100. For example, when forming the toned white image, inks of the four colors including white, yellow, light cyan and light magenta may be used, or inks of seven colors including white, yellow, black, light cyan, light magenta, cyan and magenta may be used.

Further, in the previous embodiments, the printer 100 performs printing by reciprocating (main scanning) a carriage provided with the print head 144. However, the invention can also be applied to a printing process performed by a line printer that does not reciprocate a carriage.

Further, in the previous embodiments, the printer driver 300 is included in the PC 200 and the printer 100 receives the commands from the printer driver 300 of the PC 200 to perform printing (refer to FIG. 4). However, the printer 100 may have a function equal to that of the printer driver 300 including the toned white specifying module 330 and/or the UI control module 332, and receive the color image data Cdata, the white image data WINdata of the non-overlapping part, the white image data WIOdata of the overlapping part, and the printing order specifying information SS from the application program AP of the PC 200 to perform printing. Otherwise, the printer 100 may have a function equal to that of the application program AP, and the generation of the color image data Cdata, the white image data WINdata of the non-overlapping part, the white image data WIOdata of the overlapping part and the printing order specifying information SS, and/or the printing process may be performed in the printer 100.

Further, in the first embodiment, the toned white specifying module 330 including the UI control module 332 is included in the printer driver 300 (refer to FIG. 4). However, similarly to the third embodiment (refer to FIG. 26), the printer driver 300 may not include the toned white specifying module 330, and instead, the application program AP may include the UI control module UM. In such a case, the toned white specifying processing may be performed in the application program AP, and the white image data WINdata of the non-overlapping part, to which the value (Lab value and T value) for specifying the specified toned white color is allowed to correspond, may be transmitted from the application program AP to the color conversion module 340 for the toned white image of the printer driver 300. Otherwise, the data including the value (Lab value and T value) for specifying the specified toned white color may be transmitted to the color conversion module 340 for the toned white image of the printer driver 300 independent of the white image data WINdata of the non-overlapping part. When the data including the value for specifying the toned white color is independently transmitted to the color conversion module 340, the white image data WINdata of the non-overlapping part may be configured to be input to the ink color separation processing module 350 for the toned white image other than the color conversion module 340.

Further, in the third embodiment, the UI control module UM is included in the application program APb (refer to FIG. 26). However, similarly to the first embodiment (refer to FIG. 4), the application program APb may not include the UI control module UM, and instead, the printer driver 300b may be provided with the toned white specifying module 330 including the UI control module 332. In such a case, the white image data WIdata output from the application program APb is only for specifying the white area and does not include the value (Lab value and T value) for specifying the toned white color. Further, in such a case, it is desired that the white image data WINdata of the non-overlapping part generated by the white image data conversion module 390 based on the white image data WIdata is input to the toned white specifying module 330 including the UI control module 332 so as to be used for the toned white specifying processing, and then is input to the color conversion module 340.

Further, in the previous embodiments, the processing of converting the raster data (dot data) by using a data transmission method for the print head 144 (FIG. 5) is performed in the printer 100. However, the above processing may be performed by the printer driver 300. In such a case, the printer 100 may not include the raster buffer 132.

Further, the contents of the look-up table LUTw (FIG. 14) for the toned white image and/or the look-up table LUTc (FIG. 16) for the color image in the previous embodiments are just one example. The contents, for example, may be experimentally set in advance according to the composition of inks used for the printer 100. Further, the contents may vary depending on the contents (color space used) of data output from the application program AP and/or the colors of inks used for the printer 100. Similarly to this, the contents of the color conversion processing and/or the ink color separation processing using the above tables may be variously changed.

Further, in the previous embodiments, the halftone processing is performed by the halftone processing module 320 for the color image and the halftone processing module 360 for the toned white image (FIG. 4) with reference to a desired pattern. However, the halftone processing may be performed using other methods such as an error diffusion method. Furthermore, when the printer 100 forms dots of various sizes with respect to each ink color, a multi-value conversion for determining ON/OFF of dots and dot sizes may be performed through the halftone processing, instead of binarization for determining ON/OFF of dots.

Further, the configuration (FIG. 18) of the printing order specifying command and/or the raster command and the contents of the ink code table ICT (FIG. 19) in the previous embodiments are just one example. For example, the configuration and the contents may be variously changed. In addition, in the previous embodiments, the ink code uniquely corresponds to the combination of each of the plural ink colors and each of the color image and the white image. However, the ink code is not always set in such a manner. If the ink code is set in such a manner, the CPU 110 of the printer 100 can process commands according to the ink codes included in the raster command, regardless of whether the raster command corresponds to the color image or the white image.

Further, differently from the previous embodiments, a part of the configuration realized by hardware may be replaced with software, or a part of the configuration realized by software may be replaced with hardware.

Furthermore, when the whole or a part of the functions of the invention is realized by software, the software (computer program) can be recorded on a computer-readable recording medium. In the invention, the "computer-readable recording medium" includes various internal storage devices such as RAMs or ROMs and/or external storage devices (e.g., hard disks) fixed to a computer, as well as portable recording media such as flexible disks or CD-ROMs.

E2. Modified Example 2

In the first embodiment, the overlapping white area Awo is defined as a portion which overlaps the color image Ic, except for the character image, in the white area in which the white image is to be formed (refer to FIG. 7). However, a different area may be set as the overlapping white area Awo if the different area corresponds to at least a part of the portion overlapping the color image Ic in the white area. For example, the overlapping white area Awo may be set as the whole area of the portion overlapping the color image Ic in the white area. That is, as well as the portion (hatched portion in FIG. 7D) overlapping the color image Ic of the diagram in the white area of the printed image PI illustrated in FIG. 7A, the portion overlapping the color image IC (image of "abcde" in FIG. 7A) of characters may also be set as the overlapping white area Awo.

Furthermore, in the first embodiment, the non-overlapping white area Awn is defined as a portion which does not overlap the color image Ic, except for the character image, in the white area in which the white image is to be formed. However, a different area may be set as the non-overlapping white area Awn if the different area corresponds to at least a part of the portion not overlapping the color image Ic in the white area. For example, the non-overlapping white area Awn may be set as the whole area of the portion not overlapping the color image Ic in the white area. That is, as well as the portion (hatched portion in FIG. 7D) overlapping the color image Ic of the diagram in the white area of the printed image PI illustrated in FIG. 7A, an area excluding the portion overlapping the color image IC (image of "abcde" in FIG. 7A) of characters may also be set as the non-overlapping white area Awn.

E3. Modified Example 3

In the fourth embodiment, in relation to the application program AP, the white portion Pw of the barcode Co included in the printed image PI (FIG. 28A) is not the non-overlapping white area Awn but the overlapping white area Awo, and the white image of the white portion is formed using only the white ink during printing. However, in relation to the application program AP, the white portion Pw of the barcode Co of the printed image PI may be set as the non-overlapping white area Awn as a rule. Even in such a case, the white image data WINdata of the non-overlapping part for specifying the non-overlapping white area Awn may include data for specifying the white portion Pw of the barcode Co, and the printer driver 300 receiving the white image data WINdata of the non-overlapping part may perform a control operation for specifying the white portion Pw of the barcode Co based on the white image data WINdata of the non-overlapping part and allowing the white image of the white portion to be formed by using only the white color.

Further, in the fourth embodiment, the barcode Co is included in the printed image PI. However, a code (e.g., a two-dimensional code referred to as a QR code (registered trademark)) including a white portion and a portion (e.g., a gray portion) other than a white color may be included in the printed image PI, in addition to the barcode Co. Even in such a case, a white image of the white portion constituting the code can prevent the accuracy of reading of the code from being reduced if the white image is formed using only a white ink.

E4. Modified Example 4

The previous embodiments describe the printing process of forming the color image on the transparent film as the print medium PM together with the white image, and producing a printed matter on which the color image and the white image are formed. However, the print medium PM used for the printing process is not limited to the transparent film. For example, a medium such as a semi-transparent film, a paper or cloth can be arbitrarily selected. In addition, if the transparent film is used as the print medium PM, the color image Ic can be formed to be seen as it is even in the case of the C-W print (FIG. 8B).

Further, the printer 100 in the previous embodiments can perform the printing process of forming only the color image (including a color image formed using a white ink). In such a case, without diving the nozzle array 146 (refer to FIG. 22) of the print head 144 into the upstream nozzle group and the downstream nozzle group, printing may be performed using the whole of the nozzle array 146. That is, when performing a printing process of forming the color image and the white image, the printer 100 can divide the nozzle array 146 into a nozzle group for forming the color image and a nozzle group for forming the white image, and perform printing.

E5. Modified Example 5

The display contents of the UI window W1 for specifying the toned white color and the UI window W2 (FIG. 11) for the color measurement in the previous embodiments are just one example. The display contents may be variously changed. For example, in the UI window W1 for specifying the toned white color according to the previous embodiments, the toned white color is specified by the color value in the L*a*b color system (color space). However, the toned white color may be specified by another color system (e.g., an L*u*v color system). Further, in the UI window W1 for specifying the toned white color according to the previous embodiments, the concentration of the toned white color is specified by the T value. However, the specifying by the T value may be omitted. In addition, in the UI window W1 for specifying the toned white color according to the previous embodiments, the specifying of the toned white color by the color measurement is possible (refer to the UI window W2 for the color measurement). However, the specifying of the toned white color by the color measurement is not always possible.

What is claimed is:

1. A printing apparatus that performs printing by using a plurality of color inks including a white color, the printing apparatus comprising:
   a first image forming unit that forms a first image;
   a second image forming unit that forms a second image such that at least a part of the second image overlaps the first image; and
   a control unit that controls printing such that the second image forming unit forms a first part of the second image and a second part of the second image, wherein the first part overlaps the first image and is formed by using only a white ink, and the second part does not overlap the first image and is formed by using the white ink and at least one color ink other than the white ink, and wherein the first part of the second image and the second part of the second image are contiguous.

2. The printing apparatus according to claim 1, wherein the control unit controls printing such that the second image forming unit forms the second part by a toned white color comprising a mixture of the white ink with at least one color ink other than the white ink.

3. The printing apparatus according to claim 1, wherein the control unit controls printing such that the first image forming unit and the second image forming unit such that formation of the first image by the first image forming unit is accomplished together with formation of the second image by the second image forming unit in at least a part of a period during printing.

4. The printing apparatus according to claim 3, wherein the control unit controls printing such that second image forming unit ejects the white ink and does not eject any color ink of the plurality of color inks other than the white ink.

5. The printing apparatus according to claim 4, wherein the plurality of color inks includes a combination of a light-colored ink and a dark-colored ink with respect to at least one color tone, and wherein the control unit controls printing such that the second image forming unit does not eject the dark-colored ink.

6. The printing apparatus according to claim 5, wherein the second image forming unit ejects a black ink.

7. The printing apparatus according to claim 6, wherein the control unit controls printing to form an image using the ink of the white ink and at least one color ink other than the white ink as determined by a Lab value specified through a user interface and an ink amount per a unit area.

8. A printing method performed by an ink-jet printing apparatus that performs printing by using a plurality of color inks including a white color, the printing method comprising:

forming a first image with the ink-jet printing apparatus; and forming a second image with the ink-jet printing apparatus such that at least a part of the second image overlaps the first image, wherein, in the step of forming the second image, forming a first part of the second image and a second part of the second image, and wherein the first part overlaps the first image and is formed by using only a white ink, and the second part does not overlap the first image and is formed by using the white ink and at least one color ink other than the white ink, and wherein the first part of the second image and the second part of the second image are contiguous.

* * * * *